(12) United States Patent
Iannuzzelli et al.

(10) Patent No.: US 8,111,716 B2
(45) Date of Patent: Feb. 7, 2012

(54) METHOD AND APPARATUS FOR FORMATTING DATA SIGNALS IN A DIGITAL AUDIO BROADCASTING SYSTEM

(75) Inventors: Russell Iannuzzelli, Bethesda, MD (US); Stephen Douglas Mattson, Felton, PA (US)

(73) Assignee: iBiquity Digital Corporation, Columbia, MD (US)

( * ) Notice: Subject to any disclaimer, the term of this patent is extended or adjusted under 35 U.S.C. 154(b) by 140 days.

(21) Appl. No.: 12/032,011

(22) Filed: Feb. 15, 2008

(65) Prior Publication Data

US 2009/0207861 A1    Aug. 20, 2009

(51) Int. Cl.
*H04J 3/00*    (2006.01)

(52) U.S. Cl. ........ 370/476; 370/389; 370/465; 375/295; 375/219; 375/220

(58) Field of Classification Search .......... None
See application file for complete search history.

(56) References Cited

U.S. PATENT DOCUMENTS

| | | | | |
|---|---|---|---|---|
| 5,835,036 | A * | 11/1998 | Takefman | 341/95 |
| 5,907,297 | A * | 5/1999 | Cohen et al. | 341/95 |
| 6,075,789 | A * | 6/2000 | Kasslin et al. | 370/338 |
| 6,115,422 | A * | 9/2000 | Anderson et al. | 375/240 |
| 6,373,884 | B1 * | 4/2002 | Byrns | 375/219 |
| 6,459,889 | B1 * | 10/2002 | Ruelke | 455/296 |
| 6,731,654 | B1 * | 5/2004 | Champion et al. | 370/503 |
| 6,798,789 | B1 * | 9/2004 | Jackson et al. | 370/489 |
| 6,804,223 | B2 | 10/2004 | Hoffmann et al. | |
| 6,907,006 | B1 * | 6/2005 | Sakamoto et al. | 370/236.2 |
| 6,970,956 | B1 * | 11/2005 | Gaudet | 710/30 |
| 7,031,341 | B2 * | 4/2006 | Yu | 370/469 |
| 7,227,844 | B1 * | 6/2007 | Hall et al. | 370/242 |
| 2002/0157041 | A1 * | 10/2002 | Bennett et al. | 714/43 |
| 2003/0007504 | A1 * | 1/2003 | Berry et al. | 370/465 |
| 2003/0039250 | A1 * | 2/2003 | Nichols et al. | 370/394 |
| 2004/0076188 | A1 | 4/2004 | Milbar et al. | |
| 2004/0090962 | A1 * | 5/2004 | Forest et al. | 370/392 |
| 2004/0264453 | A1 * | 12/2004 | Villefrance et al. | 370/389 |

(Continued)

OTHER PUBLICATIONS

"Digital Radio Mondiale (DRM); Distribution and Communications Protocol (DCP)", ETSI TS 102 821, V1.2.1 (Oct. 2005), 41 pgs.
"Intellectual Property Rights (IPRs); Essential, or potentially Essential, IPRs notified to ETSI in respect of ETSI standards", ETSI SR 000 314, V2.2.1 (Mar. 2007), 14 pgs.

(Continued)

*Primary Examiner* — Ricky Ngo
*Assistant Examiner* — Rasheed Gidado
(74) *Attorney, Agent, or Firm* — Robert P. Lenart, Esq.; Pietragallo Gordon Alfano Bosick & Raspanti, LLP

(57) ABSTRACT

A data unit for transmitting data in a digital broadcasting system includes a first payload field, and a first byte code field having a value indicating an offset of data in the first payload field with respect to an absent value. A method for formatting the data unit includes: providing data for a payload field for a data unit, wherein the data includes an absent byte value, determining an offset between an absent byte value and other data in the payload field, shifting the data in the payload field by the offset to produce shifted bytes, and inserting a byte code in the data unit, wherein the byte code indicates the offset. A transmitter for transmitting the data units, and a receiver for receiving the data units are also provided.

10 Claims, 16 Drawing Sheets

U.S. PATENT DOCUMENTS

| | | | |
|---|---|---|---|
| 2005/0041730 A1* | 2/2005 | Noma et al. | 375/222 |
| 2005/0239410 A1 | 10/2005 | Rochester, III | |
| 2006/0085724 A1* | 4/2006 | Merritt | 714/776 |
| 2006/0203797 A1* | 9/2006 | Abrol et al. | 370/349 |
| 2006/0251007 A1 | 11/2006 | Pragada et al. | |
| 2007/0064608 A1 | 3/2007 | Rinne et al. | |

OTHER PUBLICATIONS

W. R. Stevens, "TCP/IP Illustrated, vol. 1: The Protocols", Addison-Wesley, XP002564594, ISBN: 0201633469, 1994, pp. 6-10.

* cited by examiner

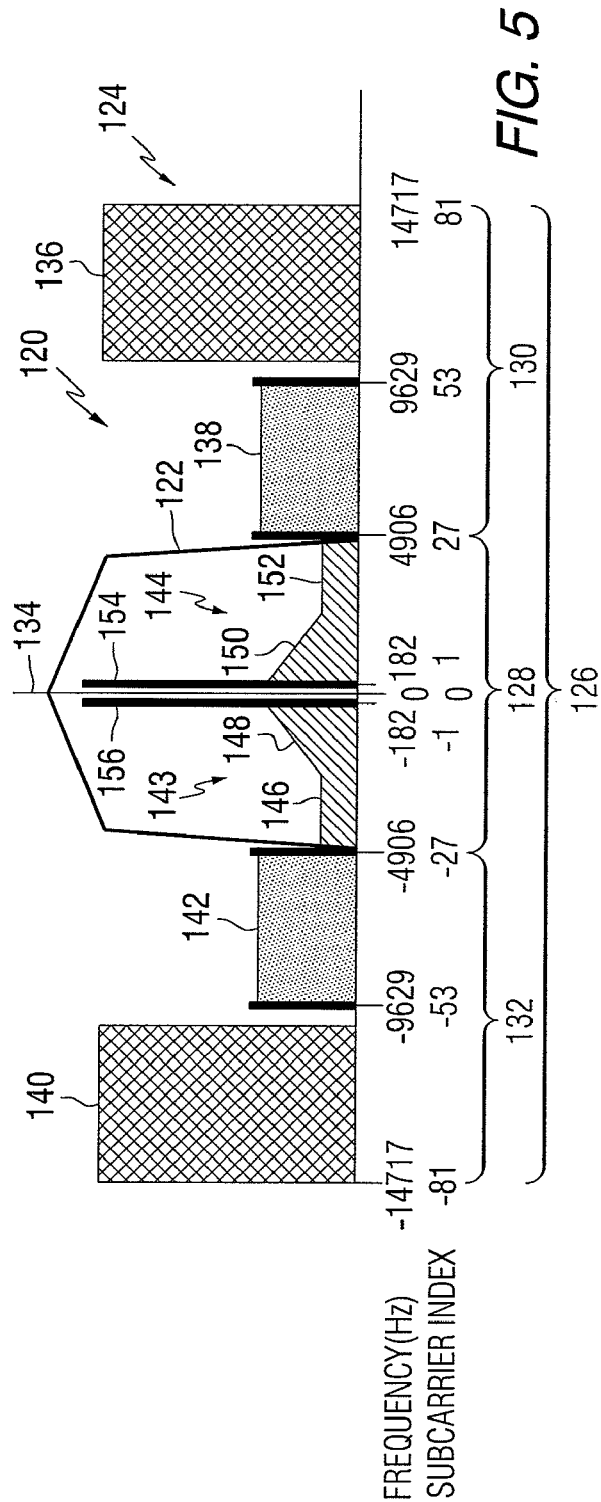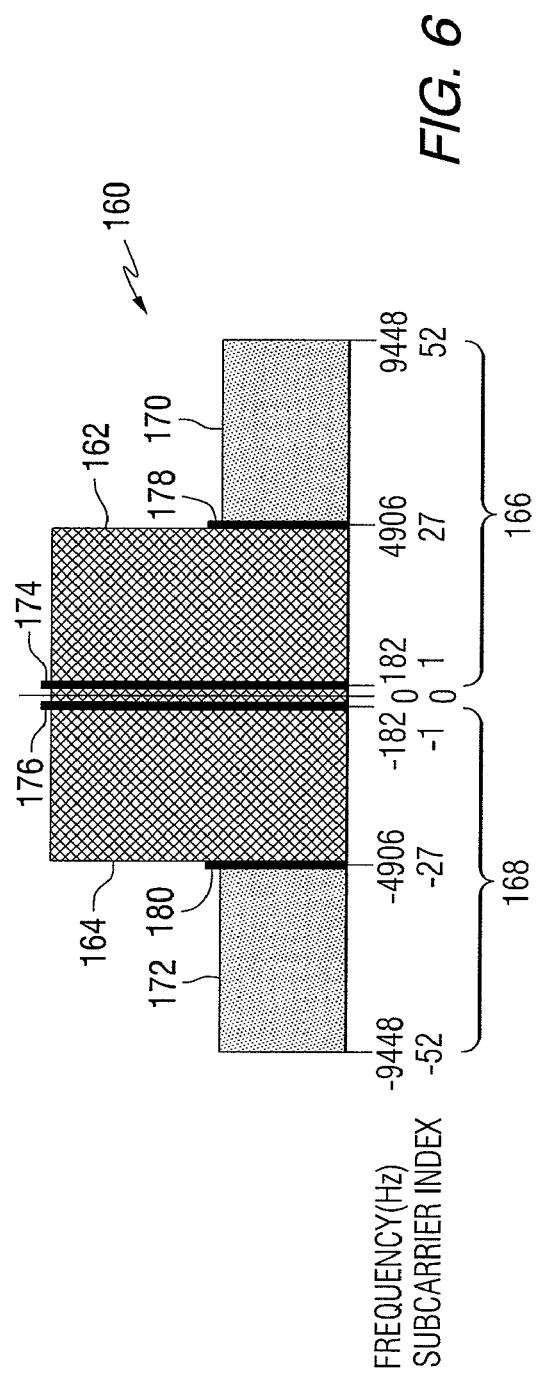

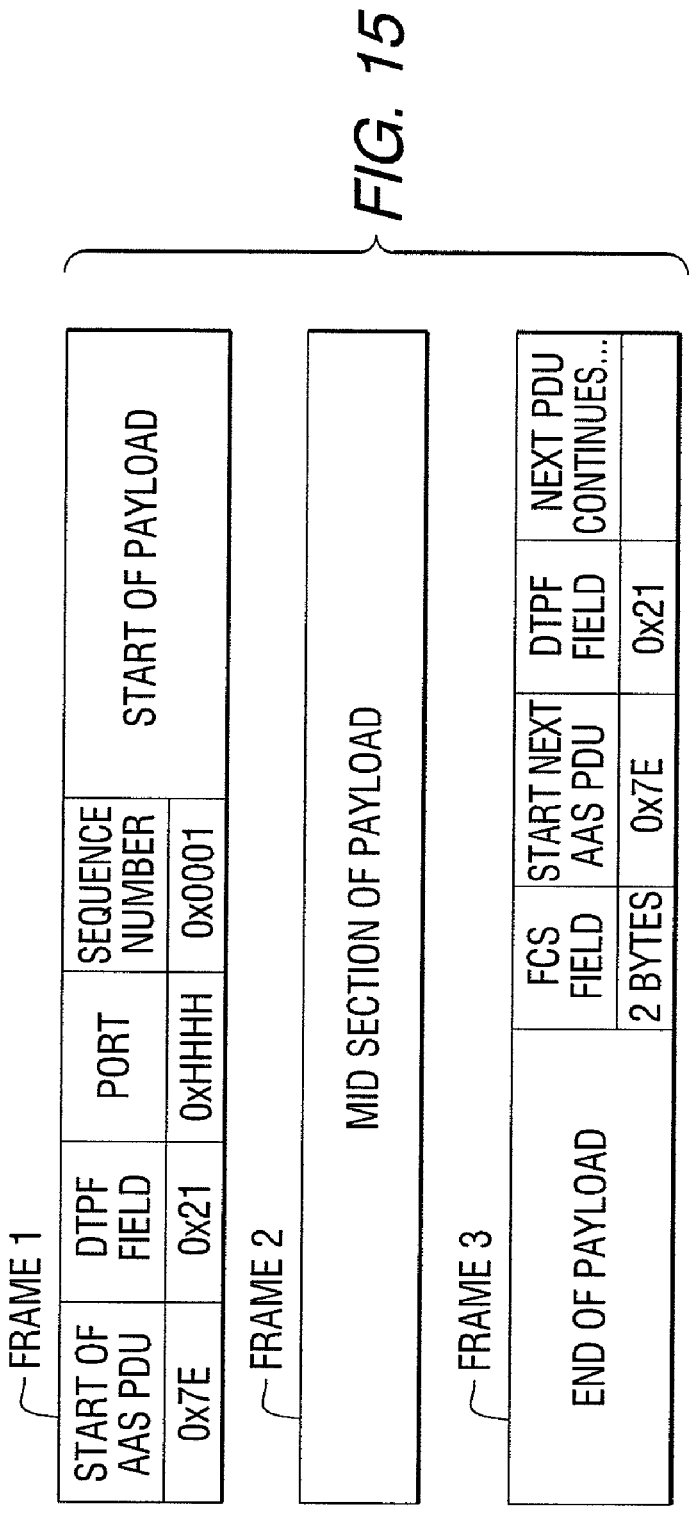

METHOD AND APPARATUS FOR FORMATTING DATA SIGNALS IN A DIGITAL AUDIO BROADCASTING SYSTEM

FIELD OF THE INVENTION

This invention relates to method and apparatus for formatting data signals in a digital audio broadcasting system.

BACKGROUND OF THE INVENTION

Digital radio broadcasting technology delivers digital audio and data services to mobile, portable, and fixed receivers. One type of digital radio broadcasting, referred to as in-band on-channel (IBOC) digital audio broadcasting (DAB), uses terrestrial transmitters in the existing Medium Frequency (MF) and Very High Frequency (VHF) radio bands. HD Radio™ technology, developed by iBiquity Digital Corporation, is one example of an IBOC implementation for digital radio broadcasting and reception. IBOC DAB signals can be transmitted in a hybrid format including an analog modulated carrier in combination with a plurality of digitally modulated carriers or in an all-digital format wherein the analog modulated carrier is not used. Using the hybrid mode, broadcasters may continue to transmit analog AM and FM simultaneously with higher-quality and more robust digital signals, allowing themselves and their listeners to convert from analog-to-digital radio while maintaining their current frequency allocations.

One feature of digital transmission systems is the inherent ability to simultaneously transmit both digitized audio and data. Thus the technology also allows for wireless data services from AM and FM radio stations. The broadcast signals can include metadata, such as the artist, song title, or station call letters. Special messages about events, traffic, and weather can also be included. For example, traffic information, weather forecasts, news, and sports scores can all be scrolled across a radio receiver's display while the user listens to a radio station.

The design provides a flexible means of transitioning to a digital broadcast system by providing three new waveform types: Hybrid, Extended Hybrid, and All-Digital. The Hybrid and Extended Hybrid types retain the analog FM signal, while the All-Digital type does not. All three waveform types conform to the currently allocated spectral emissions mask.

The digital signal is modulated using Orthogonal Frequency Division Multiplexing (OFDM). OFDM is a parallel modulation scheme in which the data stream modulates a large number of orthogonal subcarriers, which are transmitted simultaneously. OFDM is inherently flexible, readily allowing the mapping of logical channels to different groups of subcarriers.

The HD Radio system allows multiple services to share the broadcast capacity of a single station. One feature of digital transmission systems is the inherent ability to simultaneously transmit both digitized audio and data. Thus the technology also allows for wireless data services from AM and FM radio stations. First generation (core) services include a Main Program Service (MPS) and the Station Information Service (SIS). Second generation services, referred to as Advanced Application Services (AAS), include new information services providing, for example, multicast programming, electronic program guides, navigation maps, traffic information, multimedia programming and other content. The AAS Framework provides a common infrastructure to support the developers of these services. The AAS Framework provides a platform for a large number of service providers and services for terrestrial radio. It has opened up numerous opportunities for a wide range of services (both audio and data) to be deployed through the system.

The National Radio Systems Committee, a standard-setting organization sponsored by the National Association of Broadcasters and the Consumer Electronics Association, adopted an IBOC standard, designated NRSC-5A, in September 2005. NRSC-5A, the disclosure of which is incorporated herein by reference, sets forth the requirements for broadcasting digital audio and ancillary data over AM and FM broadcast channels. The standard and its reference documents contain detailed explanations of the RF/transmission subsystem and the transport and service multiplex subsystems. Copies of the standard can be obtained from the NRSC at http://www.nrscstandards.org/standards.asp. iBiquity's HD Radio technology is an implementation of the NRSC-5A IBOC standard. Further information regarding HD Radio technology can be found at www.hdradio.com and www.ibiquity.com.

The HD Radio system includes a radio link subsystem that is designed primarily for data transmission. It would be desirable to utilize the radio link subsystem to transmit data in an efficient manner.

SUMMARY OF THE INVENTION

In a first aspect, the invention provides a data unit for transmitting data including a first payload field, and a first byte code field having a value indicating an offset of data in the first payload field with respect to an absent value.

In another aspect, the invention provides a method for formatting the data unit including: providing data for a payload field for a data unit, wherein the data includes an absent byte value, determining an offset between an absent byte value and other data in the payload field, shifting the data in the payload field by the offset to produce shifted bytes, and inserting a byte code in the data unit, wherein the byte code indicates the offset.

In another aspect, the invention provides a transmission system for broadcasting a digital radio signal. The system includes: a processor for receiving data for a payload field for a data unit, wherein the data includes an absent byte value, determining an offset between an absent byte value and other data in the payload field, shifting the data in the payload field by the offset to produce shifted bytes, and inserting a byte code in the data unit, wherein the byte code indicates the offset; and a modulator for using the data units to modulate a plurality of carriers to produce an output signal.

In another aspect, the invention provides a method for receiving a digital radio signal. The method includes: receiving a plurality of data units including payload data shifted by an offset and a byte code indicating the offset, and producing an output signal in response to the data units.

In another aspect, the invention provides a receiver for receiving a digital radio signal. The receiver includes an input for receiving a plurality of data units including payload data shifted by an offset and a byte code indicating the offset, and a processor for producing an output signal in response to the data units.

In another aspect, the invention provides a method including: determining a number of escape characters in data to be transmitted, framing the data using a non-deterministic protocol if the number of escape characters is less than a threshold number, and framing the data using a deterministic protocol if the number of escape characters is equal to or greater than the threshold number.

BRIEF DESCRIPTION OF THE DRAWINGS

FIG. 5 is a schematic representation of a hybrid AM IBOC DAB waveform.

FIG. 6 is a schematic representation of an all-digital AM IBOC DAB waveform.

FIG. 15 is an example of AAS Data PDUs spanning multiple frames.

FIG. 16 is a diagram of a data packet input to HDLC framing.

FIG. 17 is a diagram of a data packet output of HDLC framing.

DETAILED DESCRIPTION OF THE INVENTION

FIGS. 1-10 and the accompanying description herein provide a general description of an IBOC system, including broadcasting equipment structure and operation, receiver structure and operation, and the structure of IBOC DAB waveforms. FIGS. 11-19 and the accompanying description herein provide a detailed description of advanced application services data formatting according to aspects of the present invention.

IBOC System and Waveforms

Figure 1:
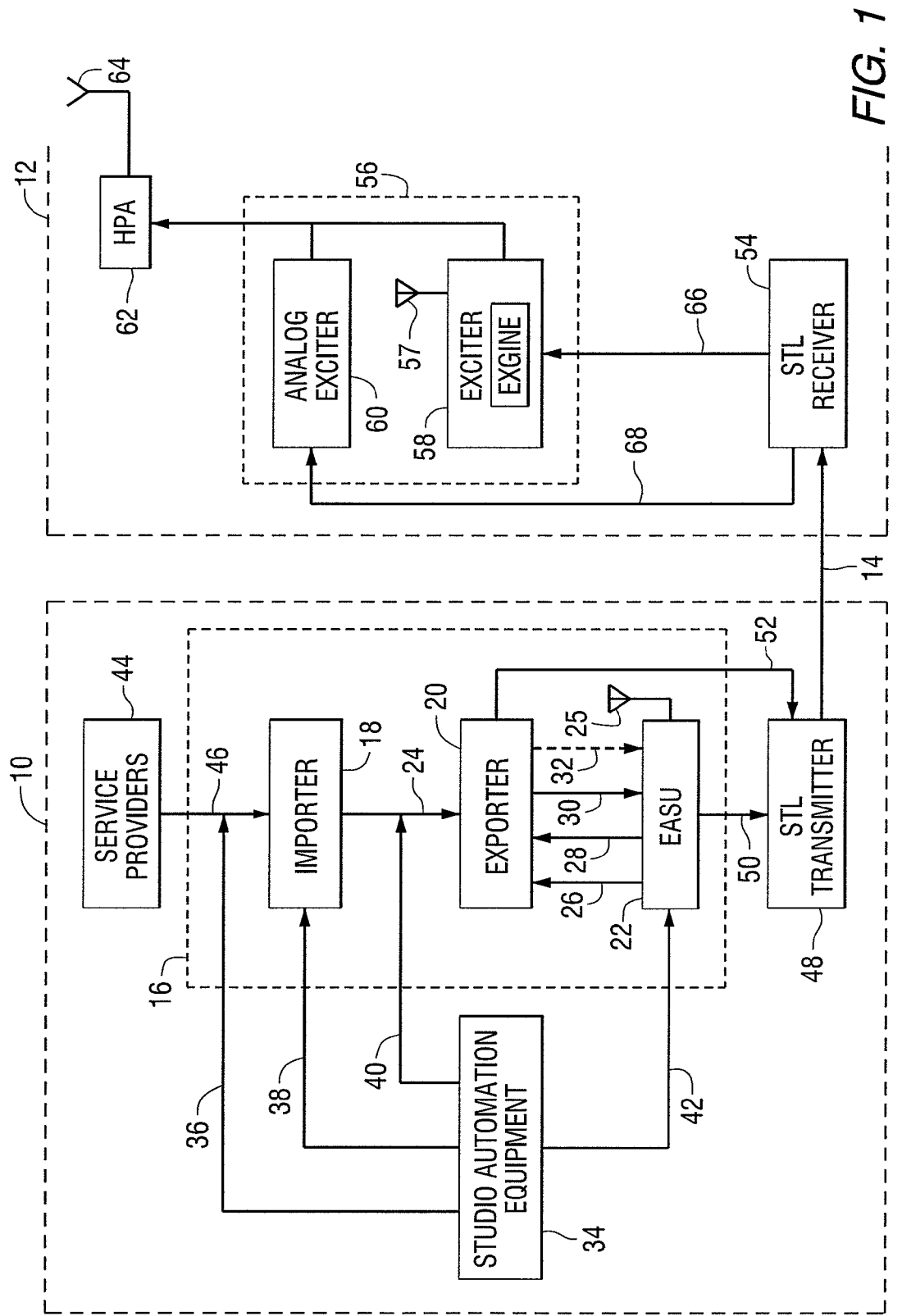
FIG. 1 is a block diagram of a transmission system for use in an in-band on-channel digital radio broadcasting system.

Referring to the drawings, FIG. 1 is a functional block diagram of the relevant components of a studio site 10, an FM transmitter site 12, and a studio transmitter link (STL) 14 that can be used to broadcast an FM IBOC DAB signal. The studio site includes, among other things, studio automation equipment 34, an Ensemble Operations Center (EOC) 16 that includes an importer 18, an exporter 20, an exciter auxiliary service unit (EASU) 22, and an STL transmitter 48. The transmitter site includes an STL receiver 54, a digital exciter 56 that includes an exciter engine (exgine) subsystem 58, and an analog exciter 60. While in FIG. 1 the exporter is resident at a radio station's studio site and the exciter is located at the transmission site, these elements may be co-located at the transmission site.

At the studio site, the studio automation equipment supplies main program service (MPS) audio 42 to the EASU, MPS data 40 to the exporter, supplemental program service (SPS) audio 38 to the importer, and SPS data 36 to the importer. MPS audio serves as the main audio programming source. In hybrid modes, it preserves the existing analog radio programming formats in both the analog and digital transmissions. MPS data, also known as program service data (PSD), includes information such as music title, artist, album name, etc. Supplemental program service can include supplementary audio content as well as program associated data.

The importer contains hardware and software for supplying advanced application services (AAS). A "service" is content that is delivered to users via an IBOC DAB broadcast, and AAS can include any type of data that is not classified as MPS, SPS, or Station Information Service (SIS). SIS provides station information, such as call sign, absolute time, position correlated to GPS, etc. Examples of AAS data include real-time traffic and weather information, navigation map updates or other images, electronic program guides, multimedia programming, other audio services, and other content. The content for AAS can be supplied by service providers 44, which provide service data 46 to the importer via an application program interface (API). The service providers may be a broadcaster located at the studio site or externally sourced third-party providers of services and content. The importer can establish session connections between multiple service providers. The importer encodes and multiplexes service data 46, SPS audio 38, and SPS data 36 to produce exporter link data 24, which is output to the exporter via a data link.

The exporter 20 contains the hardware and software necessary to supply the main program service and SIS for broadcasting. The exporter accepts digital MPS audio 26 over an audio interface and compresses the audio. The exporter also multiplexes MPS data 40, exporter link data 24, and the compressed digital MPS audio to produce exciter link data 52. In addition, the exporter accepts analog MPS audio 28 over its audio interface and applies a pre-programmed delay to it to produce a delayed analog MPS audio signal 30. This analog audio can be broadcast as a backup channel for hybrid IBOC DAB broadcasts. The delay compensates for the system delay of the digital MPS audio, allowing receivers to blend between the digital and analog program without a shift in time. In an AM transmission system, the delayed MPS audio signal 30 is converted by the exporter to a mono signal and sent directly to the STL as part of the exciter link data 52.

The EASU 22 accepts MPS audio 42 from the studio automation equipment, rate converts it to the proper system clock, and outputs two copies of the signal, one digital (26) and one analog (28). The EASU includes a GPS receiver that is connected to an antenna 25. The GPS receiver allows the EASU to derive a master clock signal, which is synchronized to the exciter's clock by use of GPS units. The EASU provides the master system clock used by the exporter. The EASU is also used to bypass (or redirect) the analog MPS audio from being passed through the exporter in the event the exporter has a catastrophic fault and is no longer operational. The bypassed audio 32 can be fed directly into the STL transmitter, eliminating a dead-air event.

STL transmitter 48 receives delayed analog MPS audio 50 and exciter link data 52. It outputs exciter link data and delayed analog MPS audio over STL link 14, which may be either unidirectional or bidirectional. The STL link may be a digital microwave or Ethernet link, for example, and may use the standard User Datagram Protocol or the standard TCP/IP.

The transmitter site includes an STL receiver 54, an exciter 56 and an analog exciter 60. The STL receiver 54 receives exciter link data, including audio and data signals as well as command and control messages, over the STL link 14. The exciter link data is passed to the exciter 56, which produces the IBOC DAB waveform. The exciter includes a host processor, digital up-converter, RF up-converter, and exgine subsystem 58. The exgine accepts exciter link data and modulates the digital portion of the IBOC DAB waveform. The digital up-converter of exciter 56 converts from digital-to-analog the baseband portion of the exgine output. The digital-to-analog conversion is based on a GPS clock, common to that of the exporter's GPS-based clock derived from the EASU. Thus, the exciter 56 includes a GPS unit and antenna 57. An alternative method for synchronizing the exporter and exciter clocks can be found in U.S. patent application Ser. No. 11/081,267 (Publication No. 2006/0209941 A1), the disclosure of which is hereby incorporated by reference. The RF up-converter of the exciter up-converts the analog signal to the proper in-band channel frequency. The up-converted signal is then passed to the high power amplifier 62 and antenna 64 for broadcast. In an AM transmission system, the exgine subsystem coherently adds the backup analog MPS audio to the digital waveform in the hybrid mode; thus, the AM transmission system does not include the analog exciter 60. In addition, the exciter 56 produces phase and magnitude information and the analog signal is output directly to the high power amplifier.

IBOC DAB signals can be transmitted in both AM and FM radio bands, using a variety of waveforms. The waveforms include an FM hybrid IBOC DAB waveform, an FM all-digital IBOC DAB waveform, an AM hybrid IBOC DAB waveform, and an AM all-digital IBOC DAB waveform.

Figure 2:
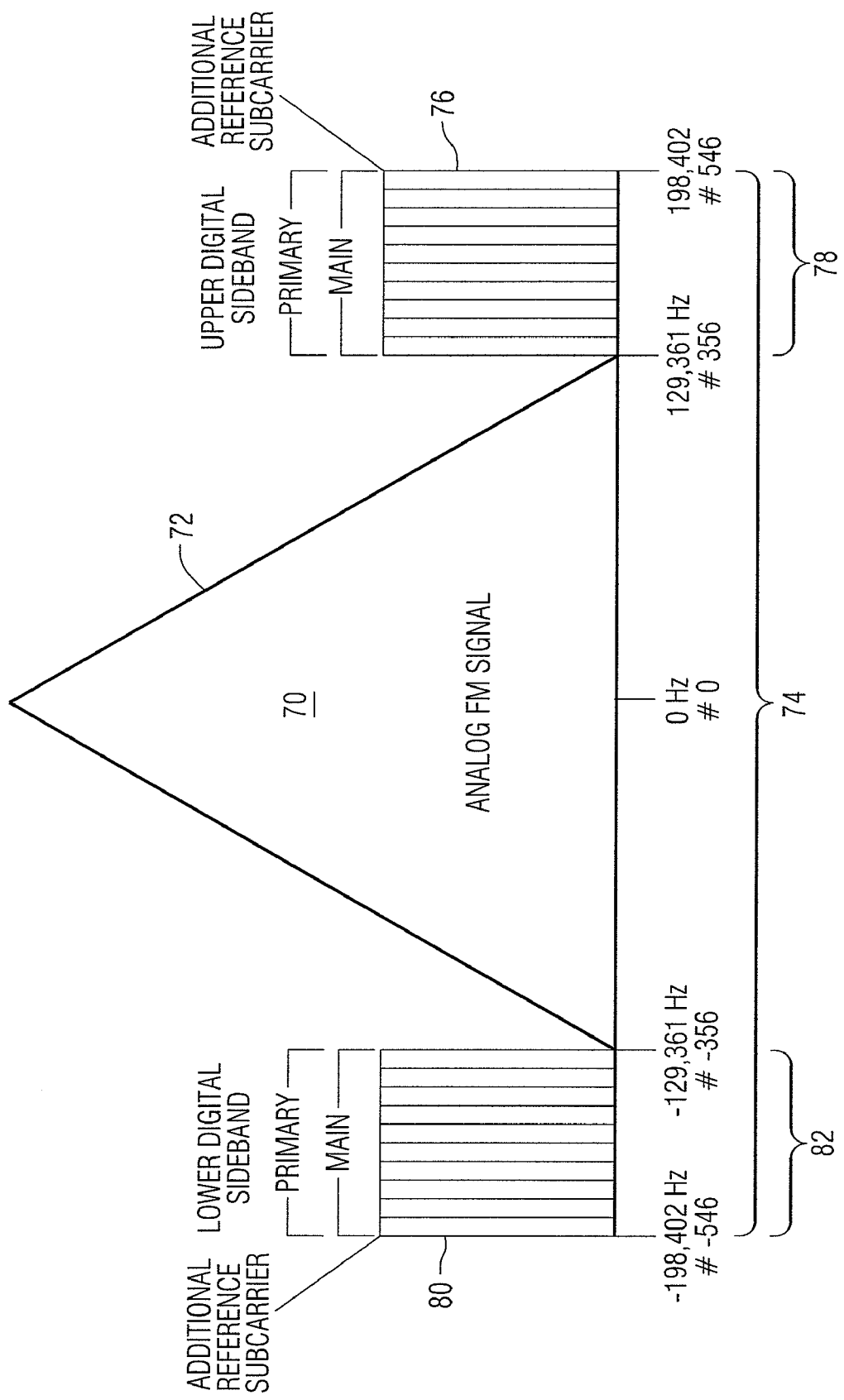
FIG. 2 is a schematic representation of a hybrid FM IBOC waveform.

FIG. 2 is a schematic representation of a hybrid FM IBOC waveform 70. The waveform includes an analog modulated signal 72 located in the center of a broadcast channel 74, a first plurality of evenly spaced orthogonally frequency division multiplexed subcarriers 76 in an upper sideband 78, and a second plurality of evenly spaced orthogonally frequency division multiplexed subcarriers 80 in a lower sideband 82. The digitally modulated subcarriers are divided into partitions and various subcarriers are designated as reference subcarriers. A frequency partition is a group of 19 OFDM subcarriers containing 18 data subcarriers and one reference subcarrier.

The hybrid waveform includes an analog FM-modulated signal, plus digitally modulated primary main subcarriers. The subcarriers are located at evenly spaced frequency locations. The subcarrier locations are numbered from −546 to +546. In the waveform of FIG. 2, the subcarriers are at locations +356 to +546 and −356 to −546. Each primary main sideband is comprised of ten frequency partitions. Subcarriers 546 and −546, also included in the primary main sidebands, are additional reference subcarriers. The amplitude of each subcarrier can be scaled by an amplitude scale factor.

Figure 3:
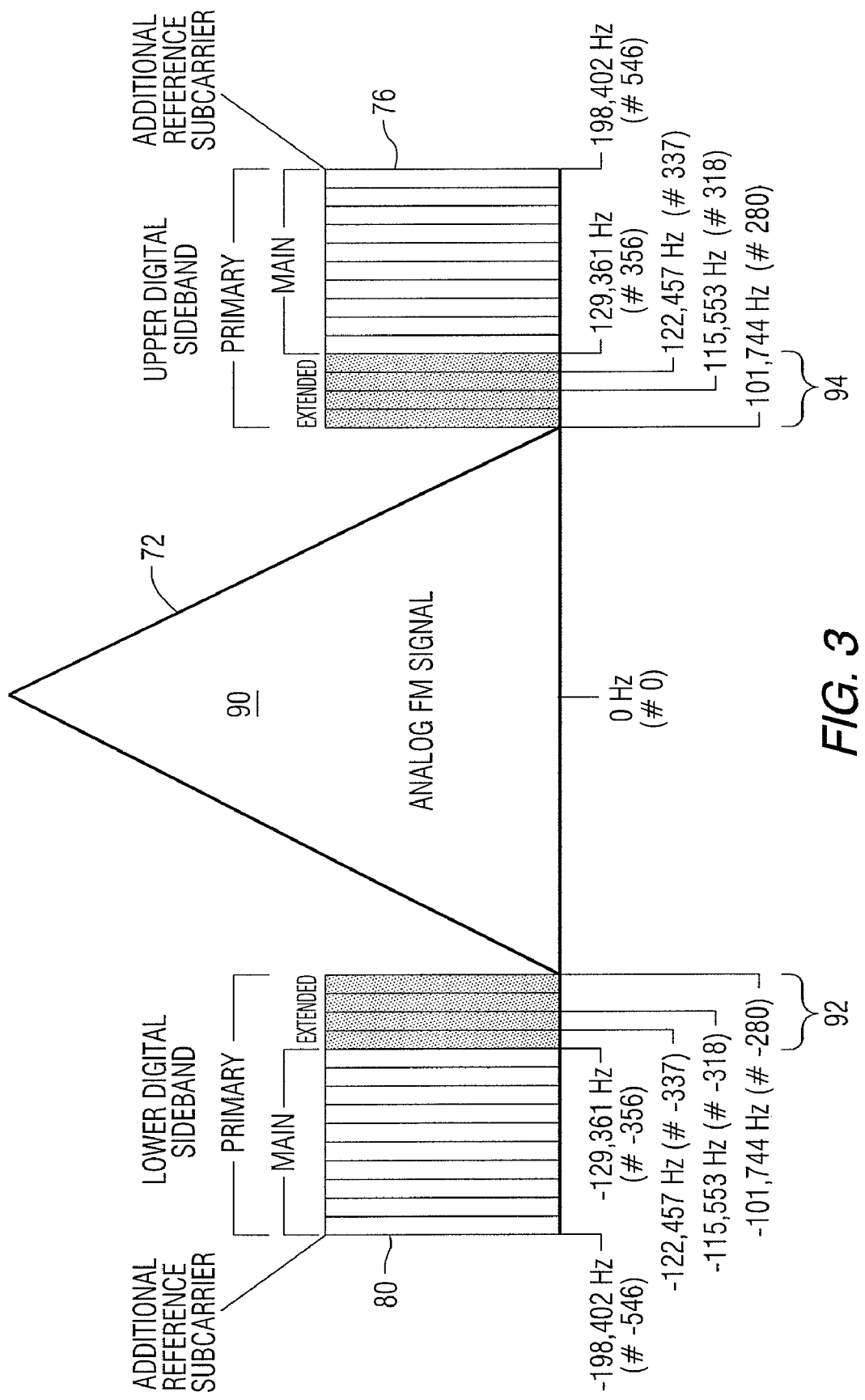
FIG. 3 is a schematic representation of an extended hybrid FM IBOC waveform.

FIG. 3 is a schematic representation of an extended hybrid FM IBOC waveform 90. The extended hybrid waveform is created by adding primary extended sidebands 92, 94 to the primary main sidebands present in the hybrid waveform. One, two, or four frequency partitions can be added to the inner edge of each primary main sideband. The extended hybrid waveform includes the analog FM signal plus digitally modulated primary main subcarriers (subcarriers +356 to +546 and −356 to −546) and some or all primary extended subcarriers (subcarriers +280 to +355 and −380 to −355).

The upper primary extended sidebands include subcarriers 337 through 355 (one frequency partition), 318 through 355 (two frequency partitions), or 280 through 355 (four frequency partitions). The lower primary extended sidebands include subcarriers −337 through −355 (one frequency partition), −318 through −355 (two frequency partitions), or −280 through −355 (four frequency partitions). The amplitude of each subcarrier can be scaled by an amplitude scale factor.

Figure 4:
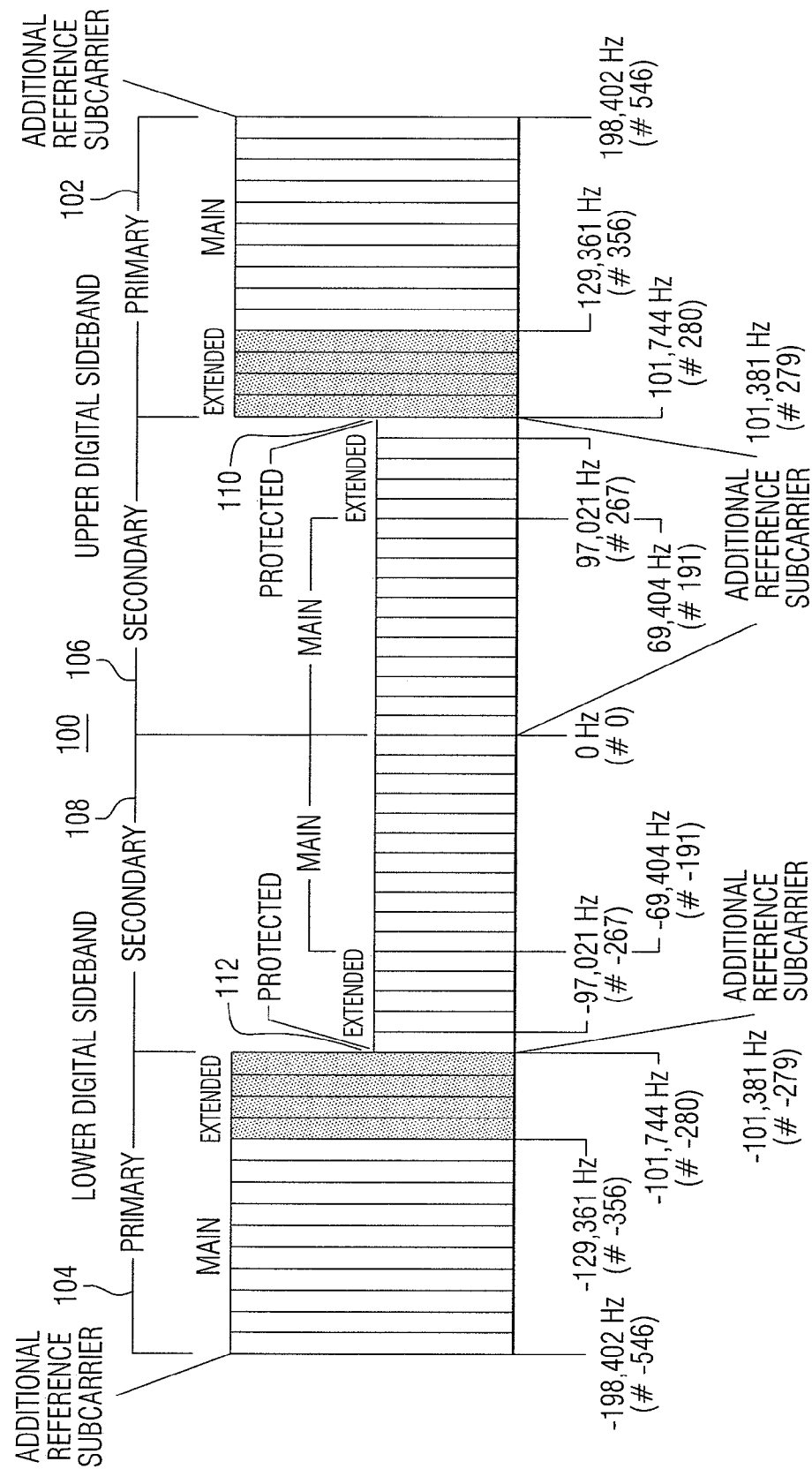
FIG. 4 is a schematic representation of an all-digital FM IBOC waveform.

FIG. 4 is a schematic representation of an all-digital FM IBOC waveform 100. The all-digital waveform is constructed by disabling the analog signal, fully expanding the bandwidth of the primary digital sidebands 102, 104, and adding lower-power secondary sidebands 106, 108 in the spectrum vacated by the analog signal. The all-digital waveform in the illustrated embodiment includes digitally modulated subcarriers at subcarrier locations −546 to +546, without an analog FM signal.

In addition to the ten main frequency partitions, all four extended frequency partitions are present in each primary sideband of the all-digital waveform. Each secondary sideband also has ten secondary main (SM) and four secondary extended (SX) frequency partitions. Unlike the primary sidebands, however, the secondary main frequency partitions are mapped nearer to the channel center with the extended frequency partitions farther from the center.

Each secondary sideband also supports a small secondary protected (SP) region 110, 112 including 12 OFDM subcarriers and reference subcarriers 279 and −279. The sidebands are referred to as "protected" because they are located in the area of spectrum least likely to be affected by analog or digital interference. An additional reference subcarrier is placed at the center of the channel (0). Frequency partition ordering of the SP region does not apply since the SP region does not contain frequency partitions.

Each secondary main sideband spans subcarriers 1 through 190 or −1 through −190. The upper secondary extended sideband includes subcarriers 191 through 266, and the upper secondary protected sideband includes subcarriers 267 through 278, plus additional reference subcarrier 279. The lower secondary extended sideband includes subcarriers −191 through −266, and the lower secondary protected sideband includes subcarriers −267 through −278, plus additional reference subcarrier −279. The total frequency span of the entire all-digital spectrum is 396,803 Hz. The amplitude of each subcarrier can be scaled by an amplitude scale factor. The secondary sideband amplitude scale factors can be user selectable. Any one of the four may be selected for application to the secondary sidebands.

In each of the waveforms, the digital signal is modulated using orthogonal frequency division multiplexing (OFDM). OFDM is a parallel modulation scheme in which the data stream modulates a large number of orthogonal subcarriers, which are transmitted simultaneously. OFDM is inherently flexible, readily allowing the mapping of logical channels to different groups of subcarriers.

In the hybrid waveform, the digital signal is transmitted in primary main (PM) sidebands on either side of the analog FM signal in the hybrid waveform. The power level of each sideband is appreciably below the total power in the analog FM signal. The analog signal may be monophonic or stereo, and may include subsidiary communications authorization (SCA) channels.

In the extended hybrid waveform, the bandwidth of the hybrid sidebands can be extended toward the analog FM signal to increase digital capacity. This additional spectrum, allocated to the inner edge of each primary main sideband, is termed the primary extended (PX) sideband.

In the all-digital waveform, the analog signal is removed and the bandwidth of the primary digital sidebands is fully extended as in the extended hybrid waveform. In addition, this waveform allows lower-power digital secondary sidebands to be transmitted in the spectrum vacated by the analog FM signal.

FIG. 5 is a schematic representation of an AM hybrid IBOC DAB waveform 120. The hybrid format includes the conventional AM analog signal 122 (bandlimited to about +5 kHz) along with a nearly 30 kHz wide DAB signal 124. The spectrum is contained within a channel 126 having a bandwidth of about 30 kHz. The channel is divided into upper 130 and lower 132 frequency bands. The upper band extends from the center frequency of the channel to about +15 kHz from the center frequency. The lower band extends from the center frequency to about −15 kHz from the center frequency.

The AM hybrid IBOC DAB signal format in one example comprises the analog modulated carrier signal 134 plus OFDM subcarrier locations spanning the upper and lower bands. Coded digital information representative of the audio or data signals to be transmitted (program material), is transmitted on the subcarriers. The symbol rate is less than the subcarrier spacing due to a guard time between symbols.

As shown in FIG. 5, the upper band is divided into a primary section 136, a secondary section 138, and a tertiary section 144. The lower band is divided into a primary section 140, a secondary section 142, and a tertiary section 143. For the purpose of this explanation, the tertiary sections 143 and 144 can be considered to include a plurality of groups of subcarriers labeled 146, 148, 150 and 152 in FIG. 5. Subcarriers within the tertiary sections that are positioned near the center of the channel are referred to as inner subcarriers, and subcarriers within the tertiary sections that are positioned farther from the center of the channel are referred to as outer subcarriers. In this example, the power level of the inner subcarriers in groups 148 and 150 is shown to decrease linearly with frequency spacing from the center frequency. The remaining groups of subcarriers 146 and 152 in the tertiary sections have substantially constant power levels. FIG. 5 also shows two reference subcarriers 154 and 156 for system control, whose levels are fixed at a value that is different from the other sidebands.

The power of subcarriers in the digital sidebands is significantly below the total power in the analog AM signal. The level of each OFDM subcarrier within a given primary or secondary section is fixed at a constant value. Primary or secondary sections may be scaled relative to each other. In addition, status and control information is transmitted on reference subcarriers located on either side of the main carrier. A separate logical channel, such as an IBOC Data Service (IDS) channel can be transmitted in individual subcarriers just above and below the frequency edges of the upper and lower secondary sidebands. The power level of each primary OFDM subcarrier is fixed relative to the unmodulated main analog carrier. However, the power level of the secondary subcarriers, logical channel subcarriers, and tertiary subcarriers is adjustable.

Using the modulation format of FIG. 5, the analog modulated carrier and the digitally modulated subcarriers are transmitted within the channel mask specified for standard AM broadcasting in the United States. The hybrid system uses the analog AM signal for tuning and backup.

FIG. 6 is a schematic representation of the subcarrier assignments for an all-digital AM IBOC DAB waveform. The all-digital AM IBOC DAB signal 160 includes first and second groups 162 and 164 of evenly spaced subcarriers, referred to as the primary subcarriers, that are positioned in upper and lower bands 166 and 168. Third and fourth groups 170 and 172 of subcarriers, referred to as secondary and tertiary subcarriers respectively, are also positioned in upper and lower bands 166 and 168. Two reference subcarriers 174 and 176 of the third group lie closest to the center of the channel. Subcarriers 178 and 180 can be used to transmit program information data.

Figure 7:
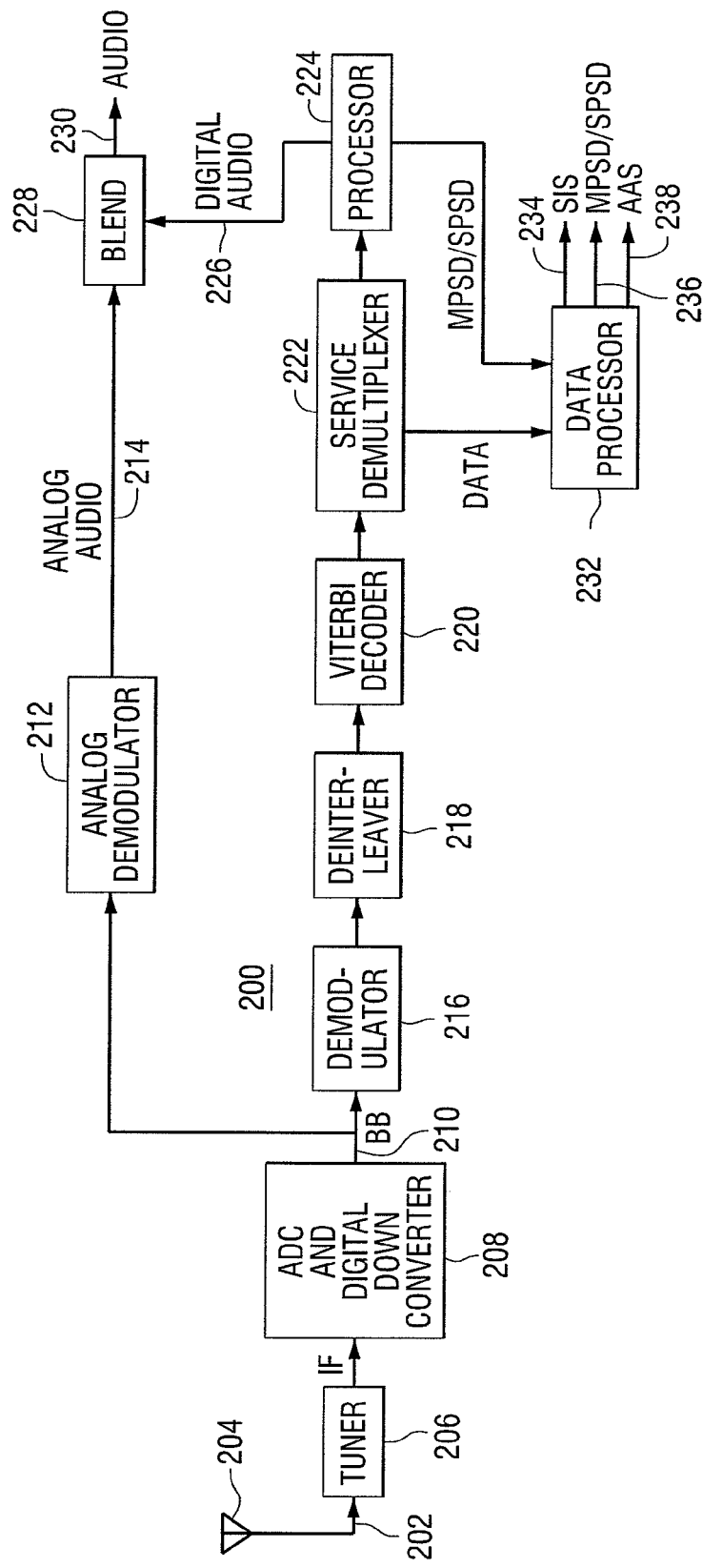
FIG. 7 is a functional block diagram of an AM IBOC DAB receiver.

FIG. 7 is a simplified functional block diagram of an AM IBOC DAB receiver 200. The receiver includes an input 202 connected to an antenna 204, a tuner or front end 206, and a digital down converter 208 for producing a baseband signal on line 210. An analog demodulator 212 demodulates the analog modulated portion of the baseband signal to produce an analog audio signal on line 214. A digital demodulator 216 demodulates the digitally modulated portion of the baseband signal. Then the digital signal is deinterleaved by a deinterleaver 218, and decoded by a Viterbi decoder 220. A service demultiplexer 222 separates main and supplemental program signals from data signals. A processor 224 processes the program signals to produce a digital audio signal on line 226. The analog and main digital audio signals are blended as shown in block 228, or a supplemental digital audio signal is passed through, to produce an audio output on line 230. A data processor 232 processes the data signals and produces data output signals on lines 234, 236 and 238. The data signals can include, for example, a station information service (SIS), main program service data (MPSD), supplemental program service data (SPSD), and one or more auxiliary application services (AAS).

Figure 8:
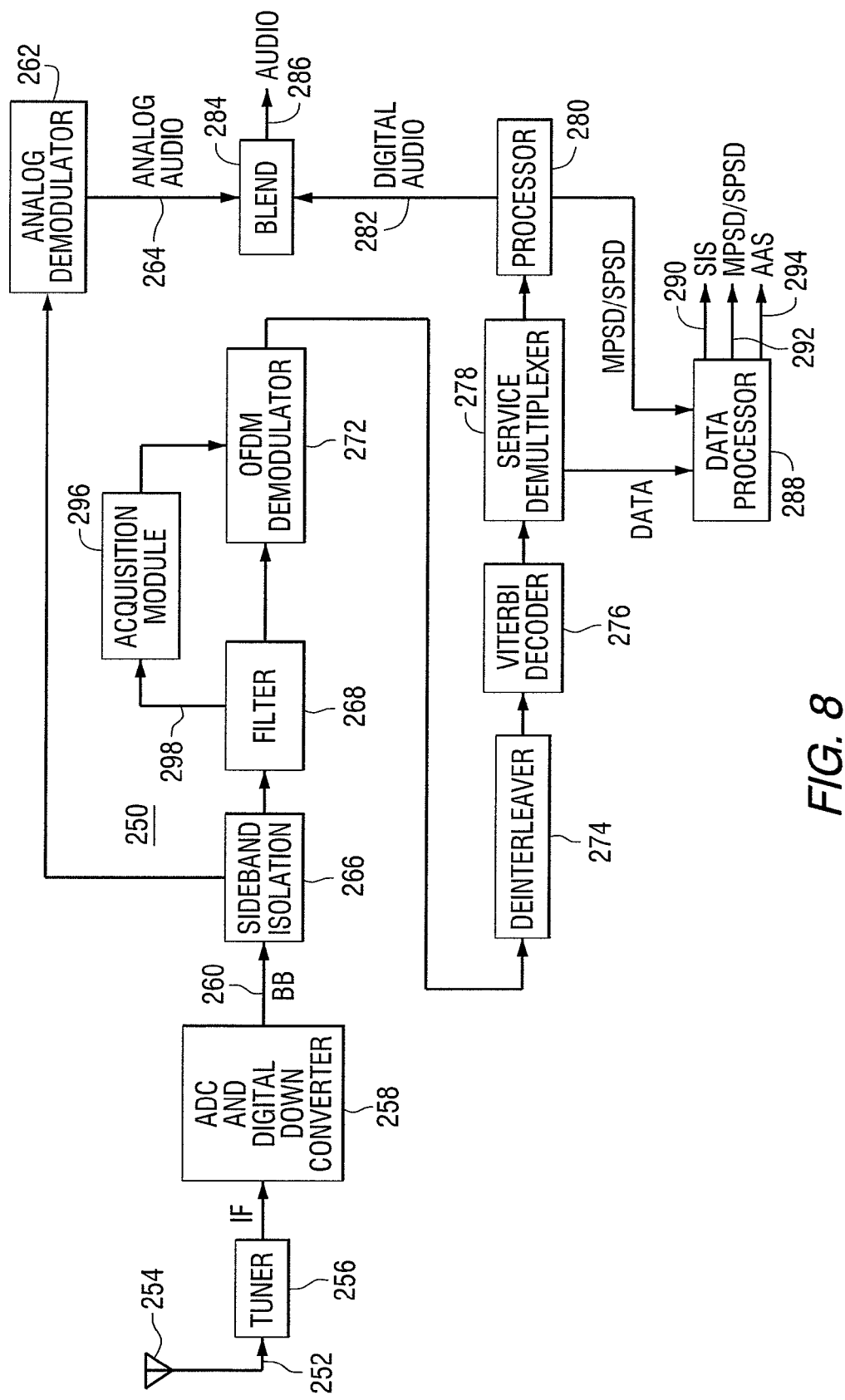
FIG. 8 is a functional block diagram of an FM IBOC DAB receiver.

FIG. 8 is a simplified functional block diagram of an FM IBOC DAB receiver 250. The receiver includes an input 252 connected to an antenna 254 and a tuner or front end 256. A received signal is provided to an analog-to-digital converter and digital down converter 258 to produce a baseband signal at output 260 comprising a series of complex signal samples. The signal samples are complex in that each sample comprises a "real" component and an "imaginary" component, which is sampled in quadrature to the real component. An analog demodulator 262 demodulates the analog modulated portion of the baseband signal to produce an analog audio signal on line 264. The digitally modulated portion of the sampled baseband signal is next filtered by sideband isolation filter 266, which has a pass-band frequency response comprising the collective set of subcarriers $f_1$-$f_n$ present in the received OFDM signal. Filter 268 suppresses the effects of a first-adjacent interferer. Complex signal 298 is routed to the input of acquisition module 296, which acquires or recovers OFDM symbol timing offset or error and carrier frequency offset or error from the received OFDM symbols as represented in received complex signal 298. Acquisition module 296 develops a symbol timing offset Δt and carrier frequency offset Δf, as well as status and control information. The signal is then demodulated (block 272) to demodulate the digitally modulated portion of the baseband signal. Then the digital signal is deinterleaved by a deinterleaver 274, and decoded by a Viterbi decoder 276. A service demultiplexer 278 separates main and supplemental program signals from data signals. A processor 280 processes the main and supplemental program signals to produce a digital audio signal on line 282. The analog and main digital audio signals are blended as shown in block 284, or the supplemental program signal is passed through, to produce an audio output on line 286. A data processor 288 processes the data signals and produces data output signals on lines 290, 292 and 294. The data signals can include, for example, a station information service (SIS), main program service data (MPSD), supplemental program service data (SPSD), and one or more advanced application services (AAS).

In practice, many of the signal processing functions shown in the receivers of FIGS. 7 and 8 can be implemented using one or more integrated circuits.

Figure 9A:
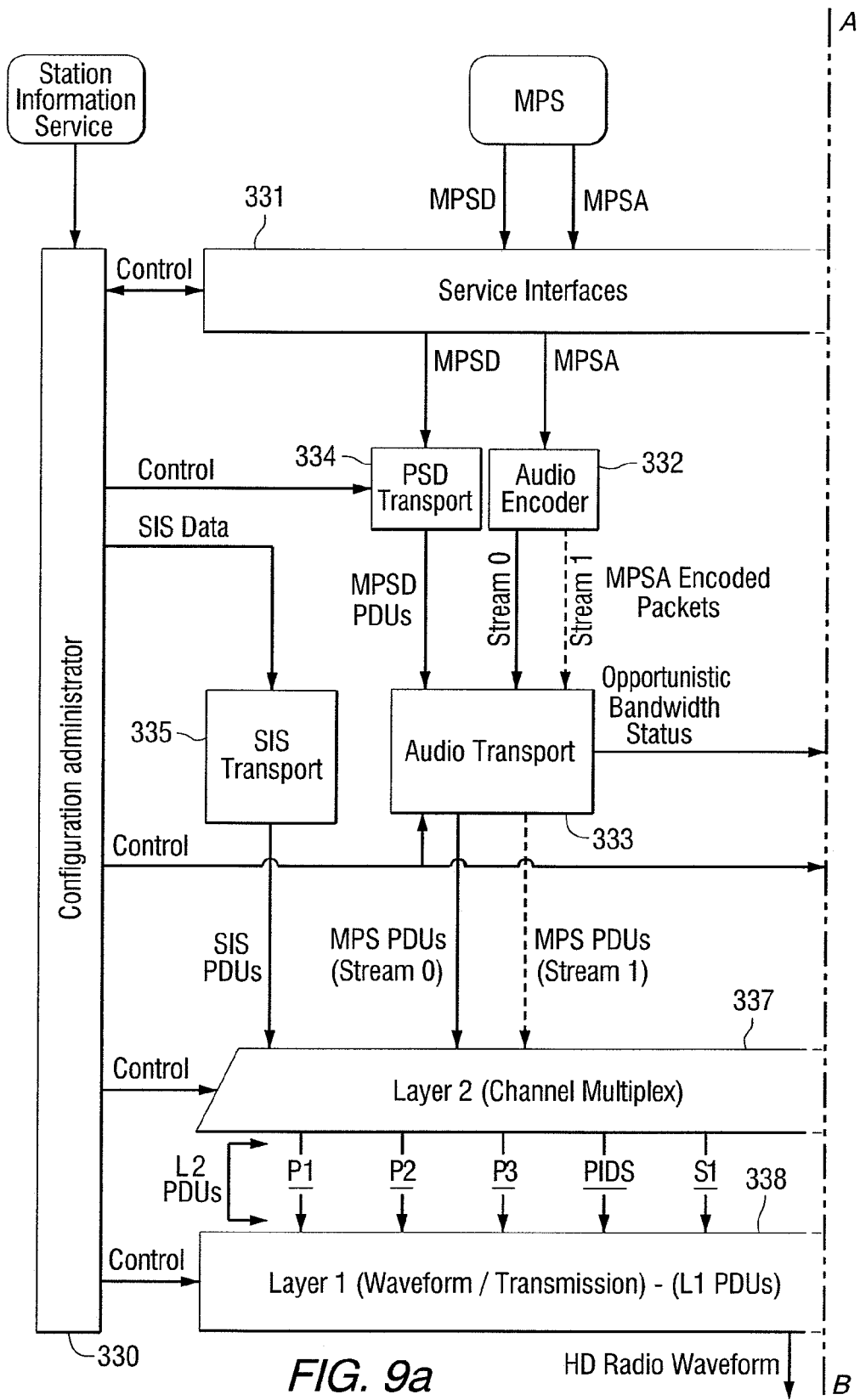
FIGS. 9a and 9b are diagrams of an IBOC DAB logical protocol stack from the broadcast perspective.
Figure 9B:
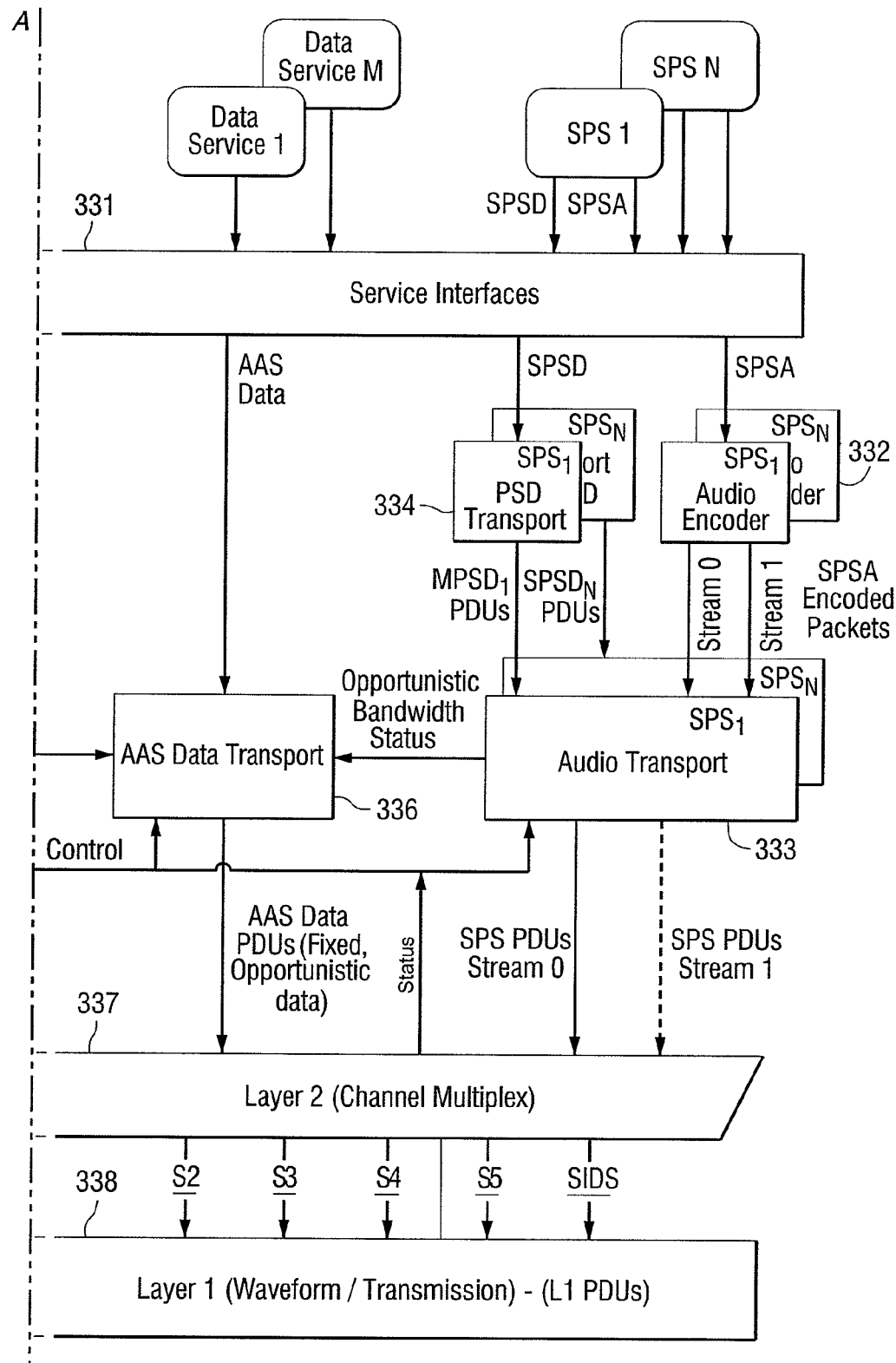

FIGS. 9a and 9b are diagrams of an IBOC DAB logical protocol stack from the transmitter perspective. From the receiver perspective, the logical stack will be traversed in the opposite direction. Most of the data being passed between the various entities within the protocol stack are in the form of protocol data units (PDUs). A PDU is a structured data block that is produced by a specific layer (or process within a layer) of the protocol stack. The PDUs of a given layer may encapsulate PDUs from the next higher layer of the stack and/or include content data and protocol control information originating in the layer (or process) itself. The PDUs generated by each layer (or process) in the transmitter protocol stack are inputs to a corresponding layer (or process) in the receiver protocol stack.

As shown in FIGS. 9a and 9b, there is a configuration administrator 330, which is a system function that supplies configuration and control information to the various entities within the protocol stack. The configuration/control information can include user defined settings, as well as information generated from within the system such as GPS time and position. The service interfaces 331 represent the interfaces for all services except SIS. The service interface may be different for each of the various types of services. For example, for MPS audio and SPS audio, the service interface may be an audio card. For MPS data and SPS data the interfaces may be in the form of different application program interfaces (APIs). For all other data services the interface is in the form of a single API. An audio codec 332 encodes both MPS audio and SPS audio to produce core (Stream 0) and optional enhancement (Stream 1) streams of MPS and SPS audio encoded packets, which are passed to audio transport 333. Audio codec 332 also relays unused capacity status to other parts of the system, thus allowing the inclusion of opportunistic data. MPS and SPS data is processed by program service data (PSD) transport 334 to produce MPS and SPS data PDUs, which are passed to audio transport 333. Audio transport 333 receives encoded audio packets and PSD PDUs and outputs bit streams containing both compressed audio and program service data. The SIS transport 335 receives SIS data from the configuration administrator and generates SIS PDUs. A SIS PDU can contain station identification and location information, program type, as well as absolute time and position correlated to GPS. The AAS data transport 336 receives AAS data from the service interface, as well as opportunistic bandwidth data from the audio transport, and generates AAS data PDUs, which can be based on quality of service parameters. The transport and encoding functions are collectively referred to as Layer 4 of the protocol stack, and the corresponding transport PDUs are referred to as Layer 4 PDUs or L4 PDUs. Layer 2, which is the channel multiplex layer (337), receives transport PDUs from the SIS transport, AAS data transport, and audio transport, and formats them into Layer 2 PDUs. A Layer 2 PDU includes protocol control information and a payload, which can be audio, data, or a combination of audio and data. Layer 2 PDUs are routed through the correct logical channels to Layer 1 (338), wherein a logical channel is a signal path that conducts L1 PDUs through Layer 1 with a specified grade of service. There are multiple Layer 1 logical channels based on service mode, wherein a service mode is a specific configuration of operating parameters specifying throughput, performance level, and selected logical channels. The number of active Layer 1 logical channels and the characteristics defining them vary for each service mode. Status information is also passed between Layer 2 and Layer 1. Layer 1 converts the PDUs from Layer 2 and system control information into an AM or FM IBOC DAB waveform for transmission. Layer 1 processing can include scrambling, channel encoding, interleaving, OFDM subcarrier mapping, and OFDM signal generation. The output of OFDM signal generation is a complex, baseband, time domain pulse representing the digital portion of an IBOC signal for a particular symbol. Discrete symbols are concatenated to form a continuous time domain waveform, which is modulated to create an IBOC waveform for transmission.

Figure 10:
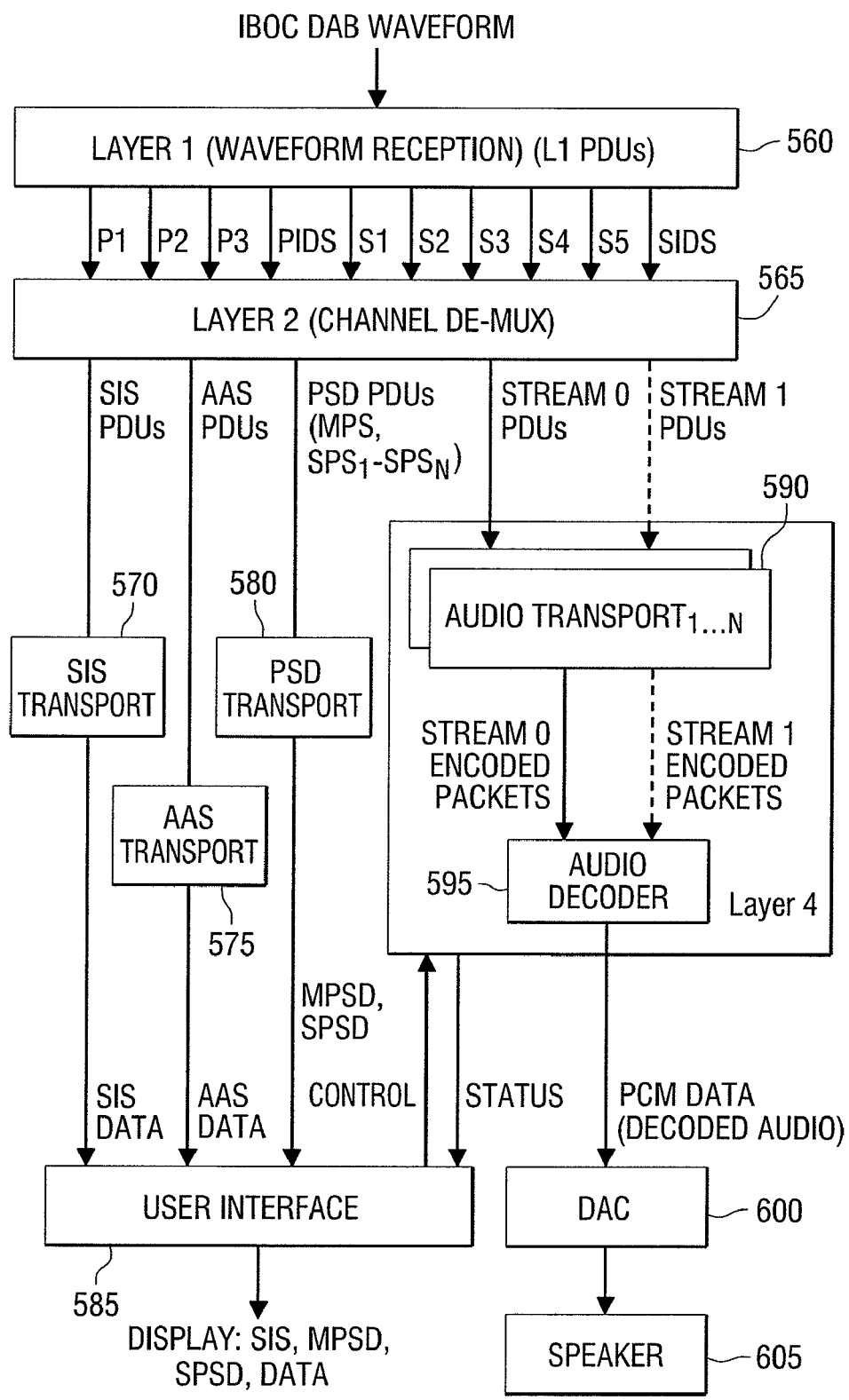
FIG. 10 is a diagram of an IBOC DAB logical protocol stack from the receiver perspective.

FIG. 10 shows the logical protocol stack from the receiver perspective. An IBOC waveform is received by the physical layer, Layer 1 (560), which demodulates the signal and processes it to separate the signal into logical channels. The number and kind of logical channels will depend on the service mode, and may include logical channels P1-P3, PIDS, S1-S5, and SIDS. Layer 1 produces L1 PDUs corresponding to the logical channels and sends the PDUs to Layer 2 (565), which demultiplexes the L1 PDUs to produce SIS PDUs, AAS PDUs, PSD PDUs for the main program service and any supplemental program services, and Stream 0 (core) audio PDUs and Stream 1 (optional enhanced) audio PDUs. The SIS PDUs are then processed by the SIS transport 570 to produce SIS data, the AAS PDUs are processed by the AAS transport 575 to produce AAS data, and the PSD PDUs are processed by the PSD transport 580 to produce MPS data (MPSD) and any SPS data (SPSD). The SIS data, AAS data, MPSD and SPSD are then sent to a user interface 590. The SIS data, if requested by a user, can then be displayed. Likewise, MPSD, SPSD, and any text based or graphical AAS data can be displayed. The Stream 0 and Stream 1 PDUs are processed by Layer 4, comprised of audio transport 590 and audio decoder 595. There may be up to N audio transports corresponding to the number of programs received on the IBOC waveform. Each audio transport produces encoded MPS packets or SPS packets, corresponding to each of the received programs. Layer 4 receives control information from the user interface, including commands such as to store or play programs, and to seek or scan for radio stations broadcasting an all-digital or hybrid IBOC signal. Layer 4 also provides status information to the user interface.

Data Formatting for Advanced Application Services

The Advanced Application Transport is comprised of the Advanced Applications Services Data Transport 336 and the SPS Audio Transport 333 shown in FIG. 9b. Various Advanced Application Services such as data services use the Service Interfaces 331 to interact with the HD Radio transmission system. The AAS Data Transport receives AAS Data packets from the Service Interfaces and then encodes and encapsulates this data to generate AAS Data PDUs. The AAS Data PDUs are then sent to Layer 2 for further processing. The AAS Data PDUs are sent over different bearer channels which can carry fixed or opportunistic data packets. The bandwidth available for opportunistic data depends on the audio content transmitted. The AAS Data Transport receives the opportunistic bandwidth status from the Audio Transport 333, thereby allowing the inclusion of opportunistic data.

Figure 11:
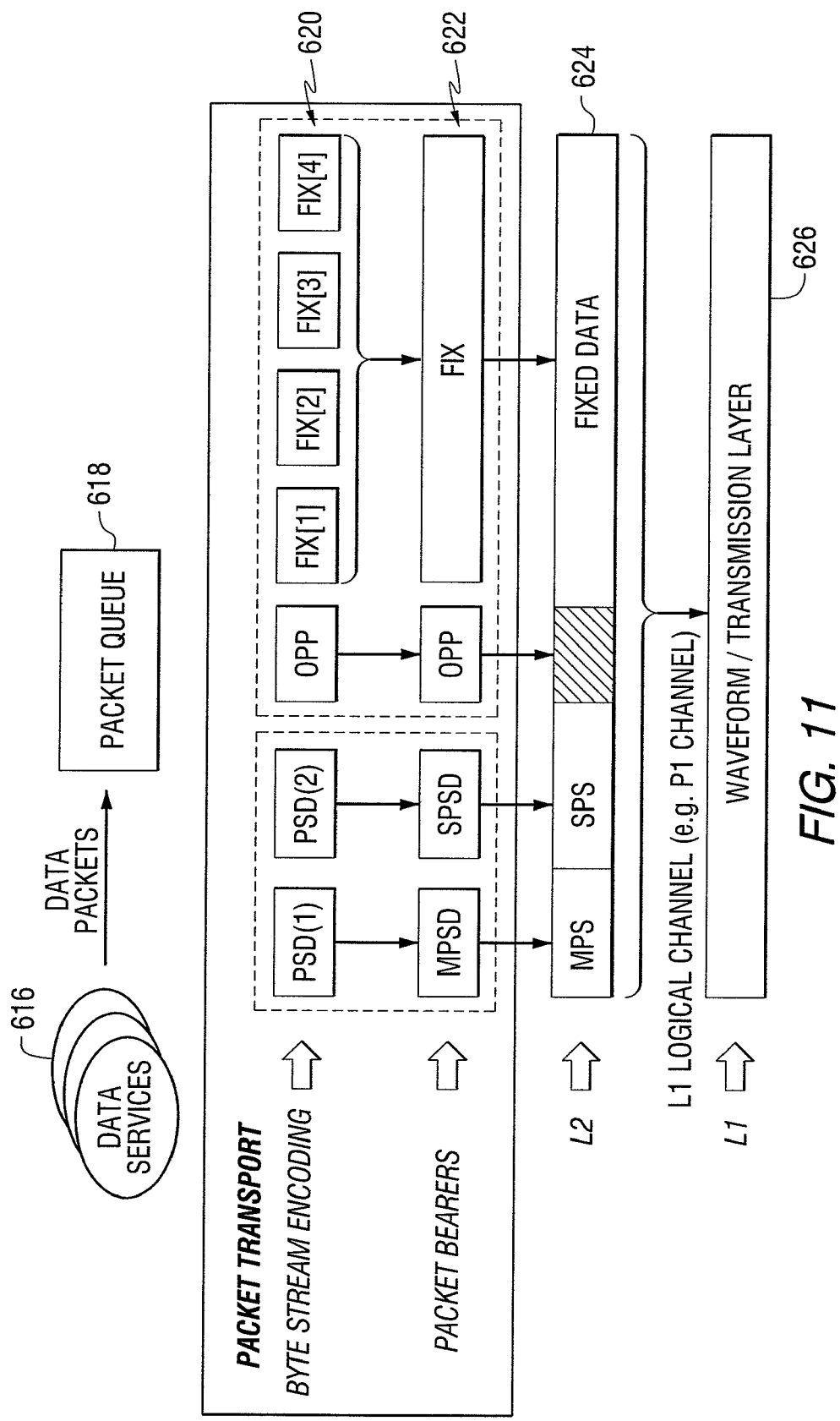
FIG. 11 is a diagram of the RLS packet transport mechanism and the processing of various data services.

A Radio Link Subsystem (RLS) provides the packet transport mechanism for the Advanced Application Data Transport and Program Service Data. RLS performs the framing and encapsulation of AAS Data packets and generates the AAS Data PDUs, which may include fixed and opportunistic data. In addition, RLS serves as the packet transport mechanism for the PSD Transport and the generation of PSD PDUs which are interleaved along with the audio content. FIG. 11 shows the RLS packet transport mechanism and the processing of various data services which are eventually output to Layer 2 on the different bearer channels. The output of Layer 2 is carried by the respective Layer 1 logical channels to the Waveform/Transmission layer. At the transmit side, data packets from various data services 616 are queued 618 for transmission. Packets to be transmitted are encoded in byte streams 620. The HD Radio system provides multiple channels for carrying packet data. These channels are categorized based on the type of data they carry and are referred to as bearer channels. FIG. 11 shows that the packet data are transmitted over one or more bearer channels 622 which are then packed into a Layer 2 PDU 624 for broadcast on a logical channel through Waveform Transmission layer 626 of the HD Radio system.

Each of the bearer channels is used to transport data packets in one or more encoded byte streams. There are several different bearer channels.

A Program Service Data (PSD) bearer channel is created from bytes allocated within the Audio Transport frames that carry digital audio for Main Program Services (MPS) and Supplementary Program Services (SPS). The Audio Transport obtains the PSD byte streams, if present, from the PSD Transport and multiplexes them with the encoded audio packets. The PSD byte streams can be either associated with the main program (i.e., Main Program Service Data (MPSD)), or with the supplemental program (i.e., Supplemental Program Service Data (SPSD)). The RLS mechanism within the PSD Transport encapsulates the data as PSD PDUs which are then multiplexed along with the audio program. The Audio Transport provides the mechanisms for inserting PSD at the transmitter and extracting it at the receiver.

A fixed data bearer channel uses a dedicated portion of the L2 PDU which has been allocated for data services. The fixed data is located at the end of the L2 PDU and maintains a constant size for long periods (i.e., many PDUs).

An opportunistic bearer is used if the audio content requires less than its allocated portion of the L2 PDU. Then the unused bytes are used to create an opportunistic bearer. The opportunistic bytes, if they exist, are located before the fixed data. If there is no fixed data allocation, opportunistic bytes are located at the end of the L2 PDU.

The AAS Data Transport uses RLS to encapsulate the fixed and opportunistic data as AAS PDUs which are sent to Layer 2.

The data packets in the HD Radio system are structured as variable length datagrams. Packets are encoded in a serial byte stream before they are carried on the bearer channels. To improve reliability, the encoded byte stream may be protected with an adjustable level of Forward Error Correction (FEC) that can be customized for each bearer channel.

The AAS data packets are structured by RLS to allow applications at the transmit side to send data to applications at the receiver over the AAT. The structure of the data packet is shown in Table 1.

TABLE 1

Data Packet Format

| Field | Size (bytes) |
|---|---|
| PORT | 2 (little-endian format) |
| SEQ | 2 (little-endian format) |
| Payload[ ] | 1-8192 (byte format) |

Port numbers distinguish data packets from different sources, and are used to allow data packets to be directed to specific applications. The format is little-endian. The sequence number maintains packet order and is used to detect missed packets. The payload contains the application data.

The mapping between applications and ports uses a combination of "well known" and "station defined" ports. In one example, port number 0x5100 is used for Main Program Service Data (MPSD) and ports 0x0000 through 0x00FF are reserved for use by the HD Radio system, and are not available to applications. The high byte of a port number refers to the type of data being transmitted. This allows filtering of data packets at the receiver. For example, Port Nos. 0x6101, 0x6102 and 0x6103 could define the traffic information from three different sources, where 0x61 refers to traffic data being transmitted. At the transmitter, each packet sent to a given port has a sequence number one greater than the previous one. The sequence number is incremented independently per port. This allows for packet order to be verified at the receiver, and for lost packets to be detected through missing sequence numbers. The sequence number is in little-endian format.

In one example, the packet payload can be of any size up to 8192 bytes in length. Large packets may be transmitted over multiple modem frames.

To send data over these channels, packets are encoded in a continuous byte stream. Successful packet delivery relies on the bearer channels to deliver the bytes in the same order that they were transmitted. Further, there is no synchronization between encoded byte streams and their bearer channels. The portion of these encoded byte streams (which a bearer channel transports in a modem frame) may contain multiple packets, a small portion of a packet, or portions of many packets (when FEC is used).

Figure 12:
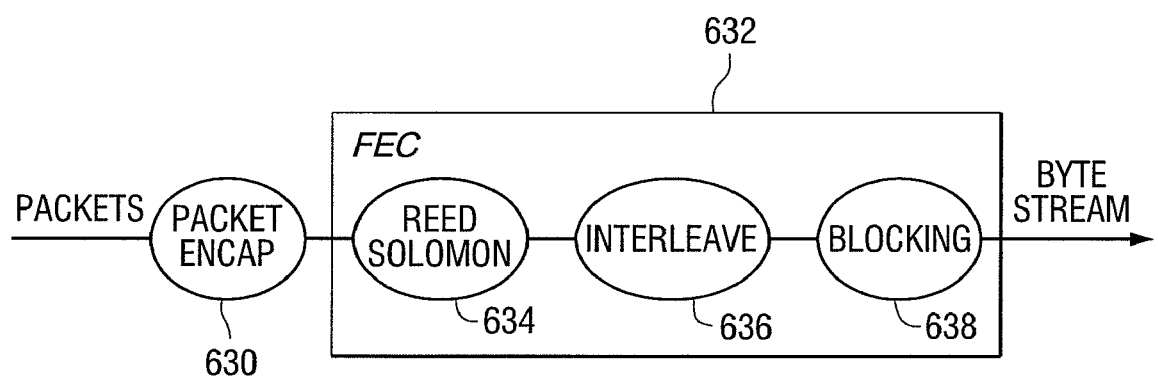
FIG. 12 is a diagram showing byte stream encoding of a data packet.

The construction of an encoded byte stream is illustrated in FIG. 12. Packet encapsulation 630 encodes AAS data packets as a serial byte stream with embedded error detection. Forward Error Correction (FEC) 632 may be applied to the encoded packet stream to control packet loss and errors. Forward error correction may include Reed Solomon block coding for error correction 634, byte interleaving 636 to protect against error bursts, and a block synchronization mechanism 638.

The packet encapsulation used by RLS follows the HDLC-like framing employed by the Point-to-Point Protocol (PPP) as standardized by the IETF in RFC-1662, "PPP in HDLC-Like Framing".

The HDLC-like framing allows encapsulation of a packet within a byte stream, referred to as an RLS PDU that may be sent in segments of arbitrary size (e.g., in each L1 frame). Reconstruction of the packet requires only concatenation of the segments. Depending on their size, a single L1 frame may contain multiple encapsulated packets or a single portion of a large packet. The L1 channel rate would depend on which L1 logical channel is being used to transport the packets.

An RLS PDU is contained in an HDLC-like frame delimited by Flags as shown in Table 3.

TABLE 3

AAS Data PDU Field Definition

| Field | Bytes | Description |
|---|---|---|
| Flag | 1 | 0x7E (Start of PDU) |
| Data Transport Packet Format (DTPF) | 1 | Identifier to define the format for the data packet |

TABLE 3-continued

AAS Data PDU Field Definition

| Field | Bytes | Description |
| --- | --- | --- |
| PORT | 2 | Identifier to indicate which application is associated with the transmitted data |
| SEQ | 2 | An incremental field to track successive packets transmitted. |
| Payload[ ] | 1-8192 | AAS Data packets. |
| FCS | 2 | A 16-bit Frame Check Sequence is used for error detection - in little-endian format. |
| Flag | 1 | 0x7E (Start of next PDU) |

This PDU structure follows that described in RFC-1662, except for the following changes: the Address and Control fields have been eliminated; the DTPF field is always 8-bits; no padding is used; and the Frame Check Sequence is always 16-bits for 8-bit DTPF fields.

Figure 13:
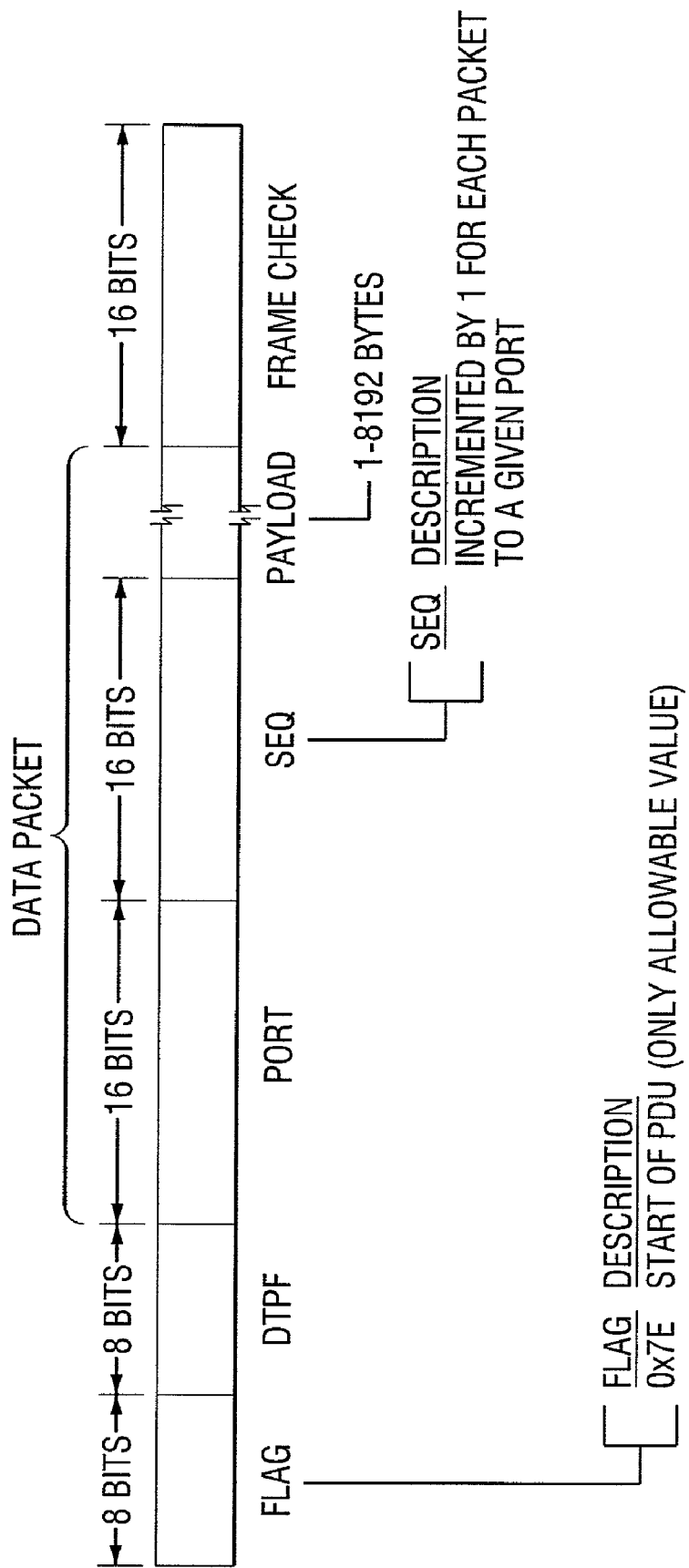
FIG. 13 is a diagram of the format for an encapsulated data packet (PDU).

FIG. 13 shows an embodiment of the structure of an AAS Data PDU. Each PDU is delimited by Flag bytes having the value 0x7E. With this structure, only one byte is needed to delimit a packet of any length; a false flag due to a payload error results only in the loss of a single PDU (data packet); and a corrupted flag cannot cause a loss of more than two PDUs (data packets).

A single L1 frame may include partial or multiple instances of such PDUs. The flag bytes help in identifying and delimiting each PDU in such instances.

The DTPF field is used to define the packet format supported. This allows new packet formats to be added in the future while retaining backward compatibility with older receivers. On receipt, any PDU with an unrecognized DTPF field should be discarded.

The Frame Check Sequence (FCS) uses a 16-bit CRC. The FCS is generated using the DTPF field and the fields in the default packet structure in accordance with RFC-1662, Section C.1. The FCS is in little-endian format.

To prevent a value of 0x7E occurring in the data from being read as a flag, an escape mechanism is provided to replace bytes with a special meaning with alternate values. This is done by replacing the special meaning byte with two bytes consisting of the control escape byte 0x7D followed by the original byte exclusive-OR'ed with hexadecimal 0x20, as described in RFC-1662, Section 4.2. The only two values that need to be escaped are: 0x7E which is encoded as 0x7D, 0x5E, (Flag Sequence), and 0x7D which is encoded as 0x7D, 0x5D (Control Escape). Since the escape mechanism requires two bytes to encode a single byte, it reduces efficiently slightly—about 1% for a packet with a random data payload.

When no packet data is available to send, an idle pattern of repeating flags is sent. This is equivalent to a stream of zero length frames and is used so that there is always data to fill a bearer channel.

Figure 14:
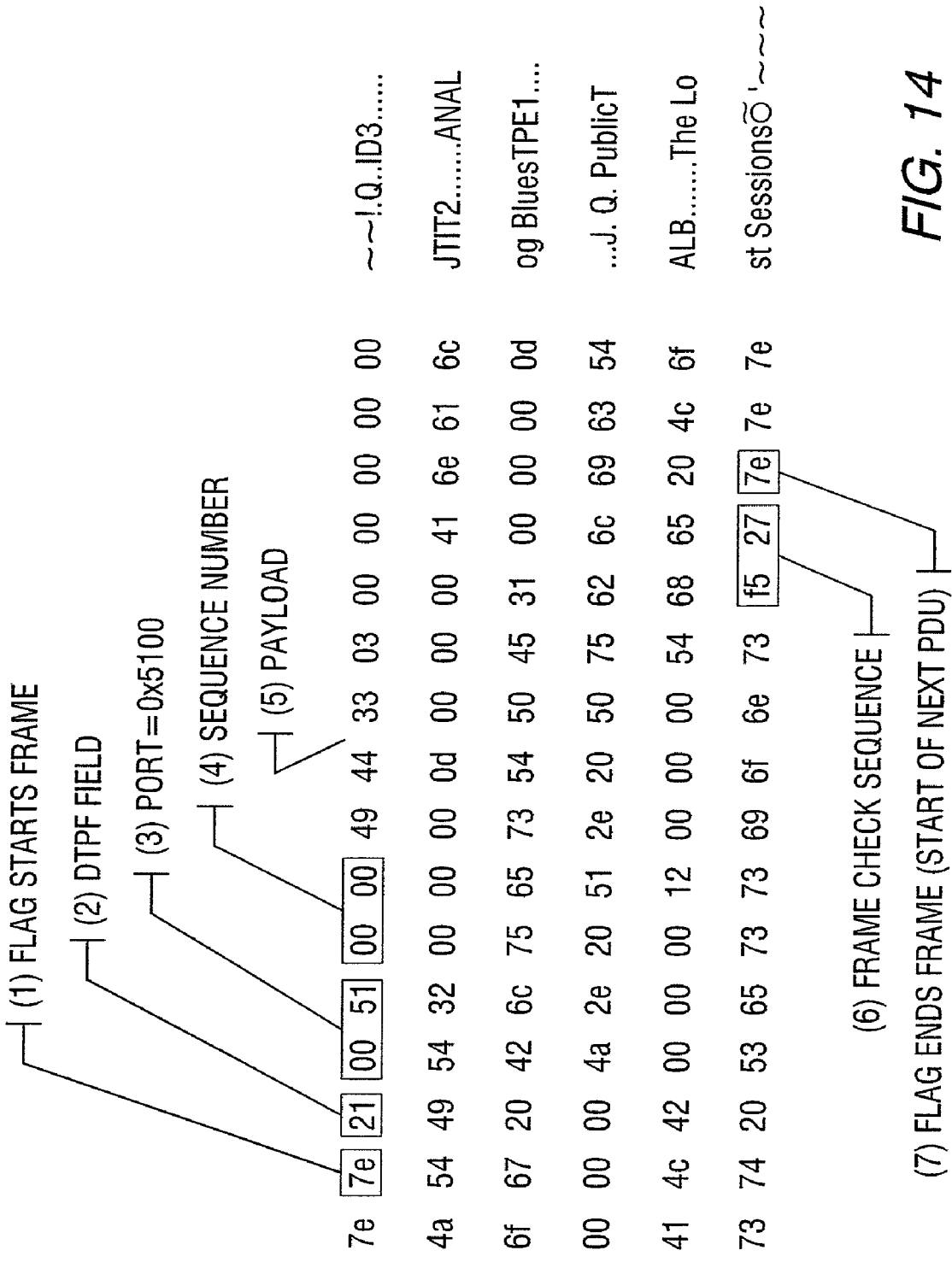
FIG. 14 is an example of an encapsulated data packet (PDU).

FIG. 14 shows an example of an encapsulated data packet (PDU). The payload shown in the example of FIG. 14 is an ID3 tag for PSD. However, this payload can also be present as AAS data. PSD is also encapsulated in a similar fashion as described above by the RLS in the PSD Transport. The following elements are noted in FIG. 14:

1. The beginning of the frame is indicated by a Flag Sequence (0x7E).
2. The first byte of the frame is the DTPF field, which in this example is set to 0x21.
3. The next two bytes contain the Port number, which in this example is 0x5100, in little-endian format.
4. A two byte Sequence Number in little-endian format follows next. The value of 0x0000 is meaningful only with respect to the sequence numbers of the previous and subsequent packets sent to port 0x5100.
5. The payload is an ID3 tag that encodes the song title ("Analog Blues"), the artist ("J. Q. Public"), and the album name ("The Lost Sessions").
6. The payload is followed by a two byte Frame Check Sequence in little-endian format. It is computed over all bytes from the DTPF field through the last byte of the payload.
7. The end of frame is indicated by a Flag Sequence (0x7E).

The byte stream shown could arrive as segments of arbitrary size so long as the byte order is preserved. Lost segments will result in short packets that fail FCS checking.

AAS Data PDUs may span multiple frames. FIG. 15 shows this example. Constraints such as the number of streams, the size of bearer channel, etc., may allow for this scenario. In other scenarios, multiple AAS Data PDUs may be transmitted within one frame.

As described above, the RLS framing protocol defines two control byte values, 0x7E and 0x7D, that may not appear in the data being transported. This constraint is addressed by using an escape mechanism where all reserved byte values appearing in the data are replaced by 2-byte sequences. Because the number of data escape sequences required to transport a particular message is unknown, the only way to guarantee delivery of the message in a known amount of time is to increase the bandwidth to allow for these extra bytes. In the extreme case where the payload data consists of all reserved byte values, this would require twice as much bandwidth.

FIG. 16 shows an example PDU prior to HDLC framing. The PDU includes a flag, a protocol ID, a Port number, a sequence number, a payload and a frame check sequence.

FIG. 17 shows an example PDU after HDLC framing. In FIG. 17, the protocol ID, Port number, sequence number, payload and frame check sequence fields have been escaped. That is, all instances of 0x7D have been replaced with 0x7D 0x5D, and all instances of 0x7E have been replaced with 0x7E 0x5E. The Protocol ID field cannot be an escape character, 0x7D or 0x7E.

Escaping can result in up to twice as many bytes. In one aspect, this invention uses byte codes to avoid escape sequences and results in a deterministic number of overhead bytes. This is referred to as a Deterministic RLS Protocol, or DRLS.

The previous RLS protocol allows for non-deterministic message sizes and therefore non-deterministic transmission rates. A small control channel added to acquisition delays and prevented delivery of time critical information. A lack of segmentation and reassembly causes the application to only have "statistical" bandwidth allocations. These characteristics can hamper a streaming application attempting to use RLS.

To address these issues, in one aspect, the invention eliminates escape characters in the data; resulting in fixed message sizes, without adding any significant overhead. Also, adding segmentation and reassembling header data allows for future use in fragmentation and reassembly on receipt of the data. This allows efficient scheduling and guaranteed bit rates to clients over small timeframes, and possible low latency streaming. This could also support a message repeat strategy in the future to enhance robustness.

Rather than reserving large amounts of bandwidth that may be used only occasionally or perhaps never, in one aspect, this invention spreads the overhead over all payloads. This can be accomplished using a thin protocol layer prior to the RLS protocol that performs data pre-conditioning to remove reserved byte values from the payload. This results in a more efficient allocation of bandwidth when guaranteed delivery time is required.

In one embodiment, for every 127-byte block of payload data, there is guaranteed to be at least one set of adjacent byte values that do not appear in the block of data. These adjacent byte values are referred to as absent byte values. An offset from the absent byte values to the reserved control byte values (i.e., 0x7D) can be calculated. Then this offset can be subtracted from the total number of bytes (e.g., 127) in the input block to produce shifted bytes. These shifted bytes will not contain any of the reserved control values in RLS. Thus in one example, every 128 bytes of pre-conditioned payload will contain one byte offset value and 127 bytes of modified data without escape characters.

The premise that there is guaranteed to be at least one pair of byte values that are not used for every 127 bytes can be understood by focusing on the worst case or most uniform distribution of bytes across the 127 bytes. That distribution would contain a byte in every other byte position. Thus, since an 8-bit word has 256 different byte values (0x00-0xFF in hexadecimal notation), every other byte would completely eliminate a contiguous 254 bytes from possibly having a pair of adjacent bytes not used or represented in the 127 bytes. This leaves 2 bytes that cannot be represented in the 127 bytes. Thus the remaining pair can be used. Any other distribution of bytes will only increase the number of adjacent pairs available. Thus, if the number of bytes to be pre-conditioned per block is limited to be 127, there will be at least one pair of bytes that will not be populated which can then be used to shift the 0x7D and 0x7E into so that they are not represented in the data.

Thus in this embodiment, every 128 bytes after the Protocol ID will include one byte code value and 127 bytes of modified data without escape characters. Using byte codes to avoid escape sequences results in a deterministic number of overhead bytes. At the receiver, the original payload is recovered by extracting the byte offset value and adding it to the next 127 bytes. This can be accomplished in a thin protocol layer outside of the RLS protocol.

Figure 18:
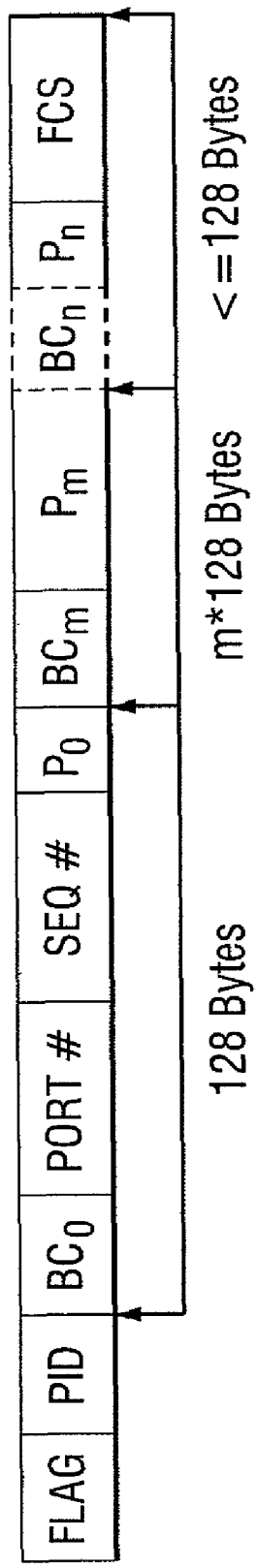
FIG. 18 is an example PDU formatted in accordance with an aspect of the invention.

FIG. 18 is an example PDU formatted in accordance with an aspect of the invention. The PDU includes a flag, a protocol ID field, a plurality of byte code values, a port ID number, a sequence number, and a plurality of partial payloads $P_i$. The partial payloads have $\leq 127$ bytes. The byte code values are used to translate or shift the 0x7E or 0x7D values so they don't have to be escaped. One byte code (value used to shift data to/from original data to/from data with no 0x7D and 0x7E values) can be inserted for every 127 bytes of input. This results in ceil (number of input bytes/127) overhead bytes. The ceil function, used to denote the next highest integer, is used to show that regardless of the size of the last block ($\leq 127$ bytes), a byte code will still be necessary in general. This is approximately equal to the number of escape bytes that would be added if all byte values were equally likely to occur in the input data, except they are added in a deterministic manner. Using a data pre-conditioner allows more efficient allocation of the bandwidth needed for RLS to deliver data in a timely manner.

Multiple protocol IDs could be used to gain more efficiency with respect to the RLS escape character insertion. In this aspect, the transmit side responsible for RLS coding the data would look across the data to be sent to see whether or not there were enough escape characters present in the data to use the DRLS method described above. A sufficient amount would be at least one escape per 127 bytes. If this many escapes or more are required, then the transmitter would use a protocol (e.g., ID 0x22) which would signal to the receiver side the use of the DRLS algorithm. This would have the desired deterministic effect of limiting the overhead to what was previously described (1 byte per 127 bytes).

However, it may be that none or very few escape characters are present in the data. In this case (i.e., less than 1 escape byte per 127 bytes), it would instead use a different protocol (e.g., 0x21) signifying the use of the RLS protocol on the data. This approach assures the use of the most efficient mechanism of providing escaping, either RLS or DRLS, and in doing so limits the overhead to be $\leq$ceil (number of input bytes/127) not just=ceil (number of input bytes/127). This combines the best features of the RLS and DRLS protocols, and provides efficiency when the data has a limited number of reserved values, and deterministic behavior in the worst case.

Figure 19:
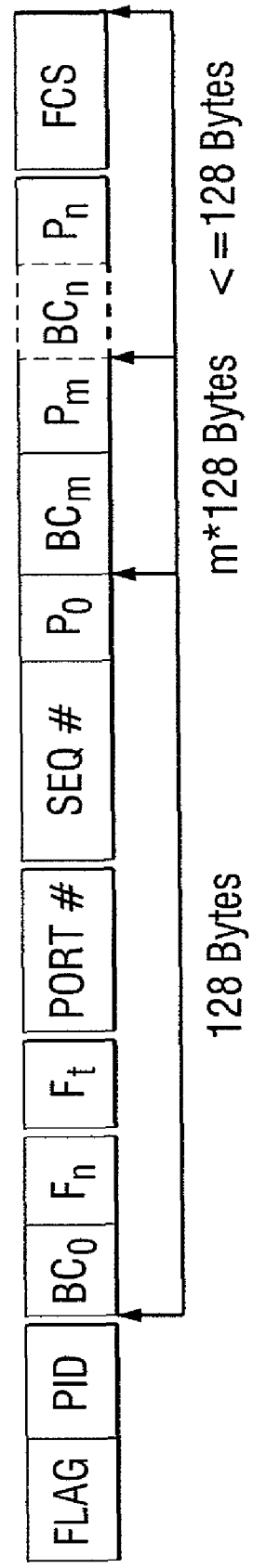
FIG. 19 is an example alternative PDU format according to an aspect of the invention.

As shown in FIG. 19, two additional fields ($F_n$ and $F_t$) can be included in order to make the DRLS design robust enough to handle all types of transfers. The $F_n$ and the $F_t$ fields indicate the message fragment number and the total number of fragments in the message being sent. This allows for reassembly of a long message at the receiver. These fields require 1 or 2 more bytes of overhead depending on the constraints placed on the total number of segments a message can use. In one example, the $F_n$ and the $F_t$ fields can be 1, 2 or 4 byte fields.

In one implementation, this invention configures a complete control channel on frame-based logical channels. This eliminates some acquisition delays, i.e., full sub-channel information sent each PDU. All frame-based PDUs will include one complete control channel frame, including escape bytes. This implies that the channel width transmitted in the sync channel will change whenever sub-channels are added or removed. Future receivers can use this framing (0x7E to 0x7E) of the control channel to immediately validate the sync channel by performing the FCS check on the received control channel.

The transmitted control channel width must allow for the maximum escape bytes and a flag byte to delimit the frame. Any unused bytes reserved for escape sequences are filled with the flag byte. This allows any fixed data on that channel to be received without multiple PDU delays.

A consequence of configuring the control channel in this way is that current receivers will drop some amount of data whenever the control channel width is changed. Potentially there will be 4-10 bytes that may not contain useful data in each PDU.

In one aspect, this invention results in an escape-less data protocol for RLS, and makes the RLS transport deterministic. This promotes efficient scheduling. The use of a fragmentation header allows for fragmentation/re-assembly across multiple HDLC frames, thereby eliminating cross-data service interference in throughput and providing the possibility of low latency video/audio streaming.

Acquisition time is minimized by eliminating potential multiple PDU delay to receive the control channel at the receiver. Frame rate channels could also avoid the sync channel validation delay by scanning for the control channel flag delimiters and then validating the FCS. Any delays caused by interleaving will still be present.

While the present invention has been described in terms of several embodiments, it will be understood by those skilled in the art that various modifications can be made to the described embodiments without departing from the scope of the invention as set forth in the claims.

What is claimed is:

1. A transmitter for broadcasting a digital radio signal, the transmitter comprising:
a processor for receiving a plurality of data bytes in a block of payload data; identifying two adjacent byte values that do not appear in the block of payload data; calculating an offset between the two adjacent byte values and two adjacent control values; shifting the values of the plurality of data bytes by the offset to produce shifted bytes; inserting a byte code and the shifted bytes in a data unit to produce a modified data unit that does not include escape values, wherein the byte code indicates the offset; and inserting a plurality of additional byte code fields and a plurality of additional shifted bytes in the modified data unit, wherein each of the additional byte code fields indicates an offset of data in one of the plurality of additional shifted bytes; and
a modulator for using the modified data unit to modulate a plurality of carriers to produce an output signal.

2. The transmitter of claim 1, wherein the processor inserts a start flag field, a protocol ID field, a port number field, a sequence number field, and a frame check sequence field in the modified data unit.

3. The transmitter of claim 1, wherein the processor inserts a frame number field and a frame total field in the modified data unit.

4. The transmitter of claim 1, wherein the processor removes reserved byte values from the payload field.

5. A digital radio receiver comprising:
an input for receiving a plurality of carriers modulated by a plurality of payload data units that do not include escape values, each data unit including a plurality of payload data byte values shifted by an offset between two adjacent byte values that do not appear in the payload data unit and two adjacent control values; and a byte code, wherein the byte code indicates the offset; and
a processor for using the data units to produce an output signal, wherein the data unit further comprises a start flag field; a protocol ID field; a port number field; a sequence number field; a frame check sequence field; a frame number field; a frame total field; a plurality of additional byte code fields; and a plurality of additional shifted bytes, wherein each of the additional byte code fields indicates an offset of data in one of the plurality of additional shifted bytes.

6. The receiver of claim 5, wherein the processor uses the additional byte code fields, the frame number field and the frame total field to reassemble the shifted bytes.

7. An apparatus comprising:
an input for receiving a plurality of blocks of bytes of payload data, each byte having a value;
a processor that calculates an offset between two byte values that do not appear in the block of payload data and two adjacent control values; subtracts the offset from the value of each of the bytes of data to produce modified data bytes in a plurality of data units that do not include escape values; inserts a start flag field, a protocol ID field, a port number field, a sequence number field, and a frame check sequence field in a data unit including the modified data bytes; and inserts a plurality of additional byte code fields and a plurality of additional shifted bytes in the data unit, wherein each of the additional byte code fields indicates an offset of data in one of the plurality of additional shifted bytes; and
a transmitter that transmits the data units including the modified data bytes and the offset to a receiver.

8. The apparatus of claim 7, wherein the processor inserts a frame number field and a frame total field in the data unit.

9. The apparatus of claim 7, wherein the two adjacent control values are 0x7D and 0x7E.

10. The apparatus of claim 7, wherein the plurality of bytes consist of 127 bytes of 8-bit data.

* * * * *